(12) United States Patent
Carlson et al.

(10) Patent No.: US 10,670,283 B2
(45) Date of Patent: Jun. 2, 2020

(54) DESICCANT WHEEL FOR A PORTABLE DEHUMIDIFER

(71) Applicant: THERMA-STOR LLC, Madison, WI (US)

(72) Inventors: Laurence A. Carlson, Stoughton, WI (US); Jeremy Daniel Coyne, Madison, WI (US); Todd R. DeMonte, Cottage Grove, WI (US); Steven S. Dingle, McFarland, WI (US); Sean Michael Ebert, Pewaukee, WI (US); Richard G. Giallombardo, Cottage Grove, WI (US); Michael J. Steffes, Poynette, WI (US); Joshua Alexander Trumm, Lake Mills, WI (US)

(73) Assignee: Therma-Stor LLC, Madison, WI (US)

( * ) Notice: Subject to any disclaimer, the term of this patent is extended or adjusted under 35 U.S.C. 154(b) by 112 days.

(21) Appl. No.: 15/632,788

(22) Filed: Jun. 26, 2017

(65) Prior Publication Data
US 2018/0372346 A1    Dec. 27, 2018

(51) Int. Cl.
| F24F 3/14 | (2006.01) |
| F24F 11/00 | (2018.01) |
| F24F 11/30 | (2018.01) |
| F24F 11/77 | (2018.01) |
| F24F 11/62 | (2018.01) |
| F24F 13/20 | (2006.01) |

(52) U.S. Cl.
CPC ............ *F24F 3/1423* (2013.01); *F24F 11/30* (2018.01); *F24F 11/62* (2018.01); *F24F 11/77* (2018.01); *F24F 3/1411* (2013.01); *F24F 13/20* (2013.01); *F24F 2003/144* (2013.01); *F24F 2013/205* (2013.01); *F24F 2203/1032* (2013.01); *F24F 2203/1036* (2013.01); *F24F 2221/12* (2013.01); *F24F 2221/125* (2013.01)

(58) Field of Classification Search
CPC .......... F24F 3/1423; F24F 11/62; F24F 11/77; F24F 11/30; F24F 3/1411; F24F 2003/144; F24F 2013/205; F24F 2203/1032; F24F 2203/1036; F24F 2221/12; F24F 2221/125; F24F 13/20
USPC ............................................ 62/271
See application file for complete search history.

(56) References Cited

U.S. PATENT DOCUMENTS

| 3,102,407 A * | 9/1963 | Stilwell, Jr. ............. D06F 25/00 68/12.14 |
| 2009/0044555 A1 * | 2/2009 | Park ...................... F24F 3/1423 62/271 |

FOREIGN PATENT DOCUMENTS

CN  104633793 A  5/2015

OTHER PUBLICATIONS

Canadian Intellectual Property Office, Canadian Office Action, Application No. 3,007,596, dated Aug. 29, 2018, 5 pages.

* cited by examiner

*Primary Examiner* — Joel M Attey
(74) *Attorney, Agent, or Firm* — Baker Botts L.L.P.

(57) ABSTRACT

A desiccant wheel for a dehumidifier includes a band of material around an outer circumference of the desiccant wheel and a plurality of sprocket holes formed in the band of material. The plurality of sprocket holes are configured for coupling the desiccant wheel to a sprocket. The desiccant wheel is configured to rotate when the sprocket is rotated by a motor.

19 Claims, 17 Drawing Sheets

DESICCANT WHEEL FOR A PORTABLE DEHUMIDIFER

TECHNICAL FIELD

This invention relates generally to dehumidification and more particularly to a desiccant wheel for a portable dehumidifier.

BACKGROUND OF THE INVENTION

In certain situations, it is desirable to reduce the humidity of air within a structure. For example, in fire and flood restoration applications, it may be desirable to quickly remove water from areas of a damaged structure. To accomplish this, one or more portable dehumidifiers may be placed within the structure to dehumidify the air and direct dry air toward water-damaged areas. Current dehumidifiers, however, have proven inefficient in various respects.

SUMMARY OF THE INVENTION

According to embodiments of the present disclosure, disadvantages and problems associated with previous dehumidification systems may be reduced or eliminated.

In some embodiments, a portable dehumidifier includes a cabinet, a plurality of wheels coupled to the cabinet, a desiccant cassette configured to be inserted into the cabinet, and a desiccant wheel configured to be removably coupled to the desiccant cassette. The desiccant wheel includes a band around an outer circumference of the desiccant wheel and a plurality of sprocket holes formed in the band. The plurality of sprocket holes are arranged in a line. The portable dehumidifier further includes a motor and a sprocket. The sprocket includes a plurality of teeth that are configured to be inserted into the plurality of sprocket holes of the band. The motor is configured to rotate the sprocket, thereby causing the desiccant wheel to rotate within the desiccant cassette.

In some embodiments, a portable dehumidifier includes a desiccant cassette, a desiccant wheel, a sprocket, and a motor. The desiccant wheel is configured to be removably coupled to the desiccant cassette. The desiccant wheel includes a band around an outer circumference of the desiccant wheel and a plurality of sprocket holes formed in the band. The sprocket includes a plurality of teeth that are configured to be inserted into the plurality of sprocket holes of the band. The motor is configured to rotate the sprocket, thereby causing the desiccant wheel to rotate within the desiccant cassette.

In certain embodiments, a desiccant wheel for a dehumidifier includes a band of material around an outer circumference of the desiccant wheel and a plurality of sprocket holes formed in the band of material. The plurality of sprocket holes are configured for coupling the desiccant wheel to a sprocket. The desiccant wheel is configured to rotate when the sprocket is rotated by a motor.

Certain embodiments of the present disclosure may provide one or more technical advantages. For example, certain embodiments provide a portable dehumidifier that is more compact and rugged than existing systems. For example, certain embodiments include a plenum above the desiccant that the reactivation airflow enters after leaving the desiccant. In some embodiments, the plenum is not the full height of the reactivation airflow outlet. This minimizes the height needed for the reactivation airflow outlet compartment, which allows a shorter overall height of the unit. In some embodiments, the reactivation airflow outlet is adjacent to the desiccant, which permits the reactivation airflow to exit the unit out of the same space of the desiccant. This also contributes to a more compact design, which is advantageous in applications such as the restoration market.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

In certain situations, it is desirable to reduce the humidity of air within a structure. For example, in fire and flood restoration applications, it may be desirable to remove water from a damaged structure by placing one or more portable dehumidifiers within the structure. Current dehumidifiers, however, have proven inadequate or inefficient in various respects.

To address the inefficiencies and other issues with current portable dehumidification systems, the disclosed embodiments provide a portable desiccant dehumidifier that includes a removable desiccant that rotates as two different airflows travel through it. First, a process airflow travels through a portion of the desiccant to provide dehumidification. Second, a reactivation airflow travels through a different portion of the desiccant to dry the desiccant. Some embodiments include a plenum above the desiccant that the reactivation airflow enters after leaving the desiccant. In some embodiments, a reactivation airflow outlet is adjacent to the desiccant. The reactivation airflow outlet permits the reactivation airflow to exit the portable desiccant dehumidifier from the plenum out of the same space of the desiccant. This reduces the overall height of the portable desiccant dehumidifier, which is desirable in many applications. In some embodiments, the plenum is not the full height of the reactivation airflow outlet. This minimizes the height needed for the reactivation airflow outlet compartment, which also helps reduce the overall height of the portable desiccant dehumidifier.

Figure 4:
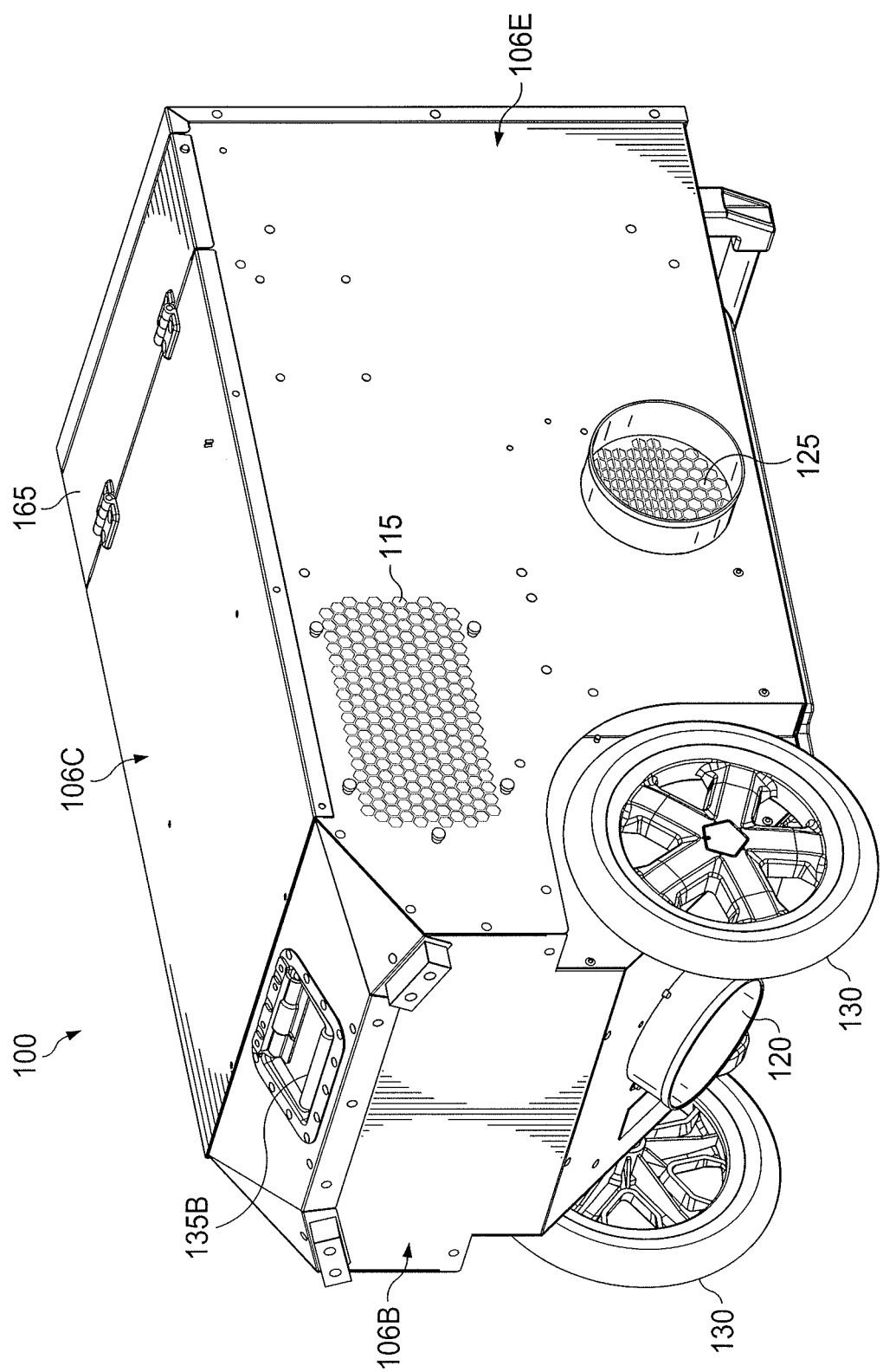
Figure 5:
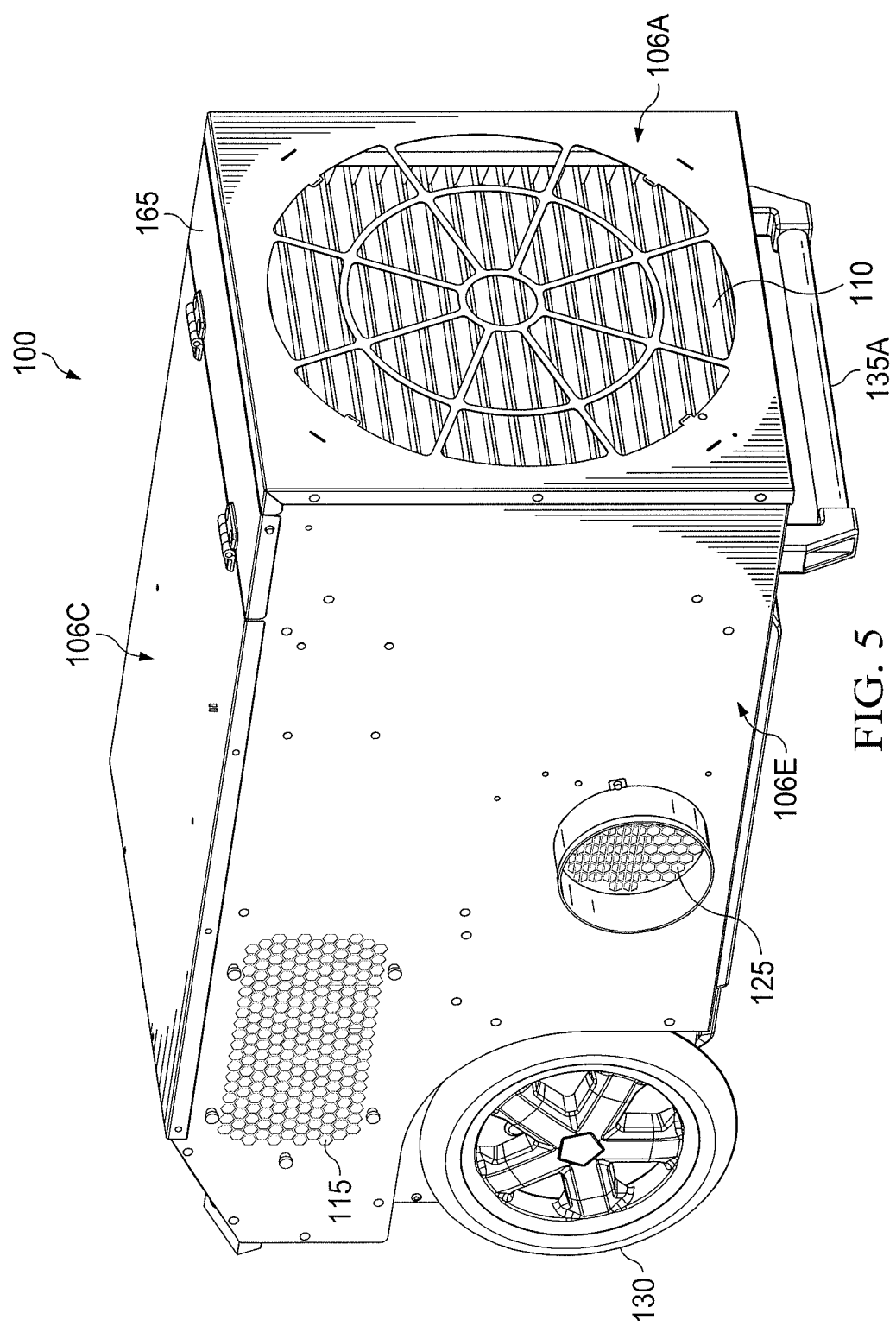
Figure 6:
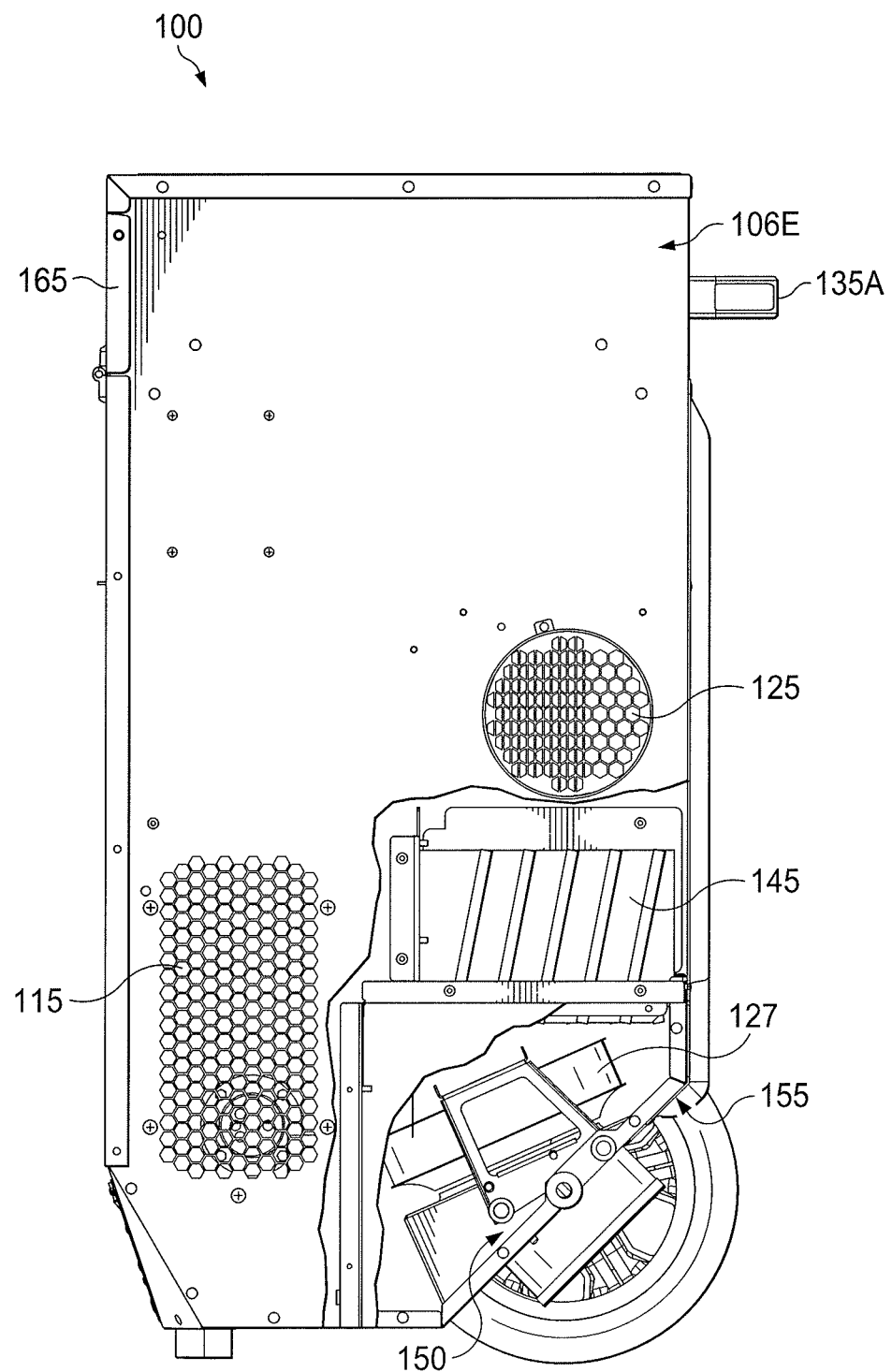
FIG. 6 illustrates a cut-away side view of a portion of the portable desiccant dehumidifier of FIGS. 1-5, according to certain embodiments.
Figure 7:
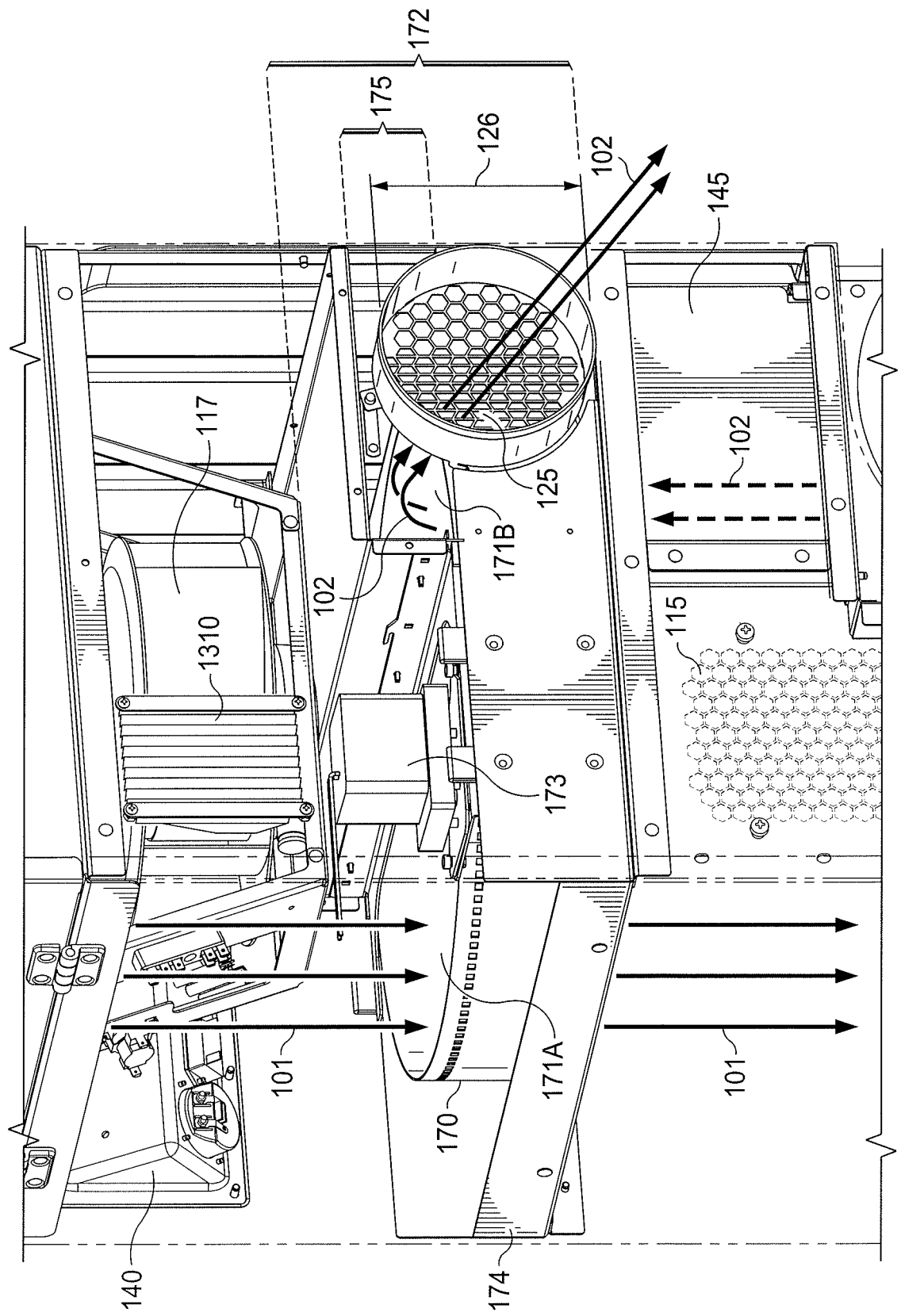
FIG. 7 illustrates airflow patterns through a desiccant wheel of the portable desiccant dehumidifier of FIGS. 1-5, according to certain embodiments.
Figure 8:
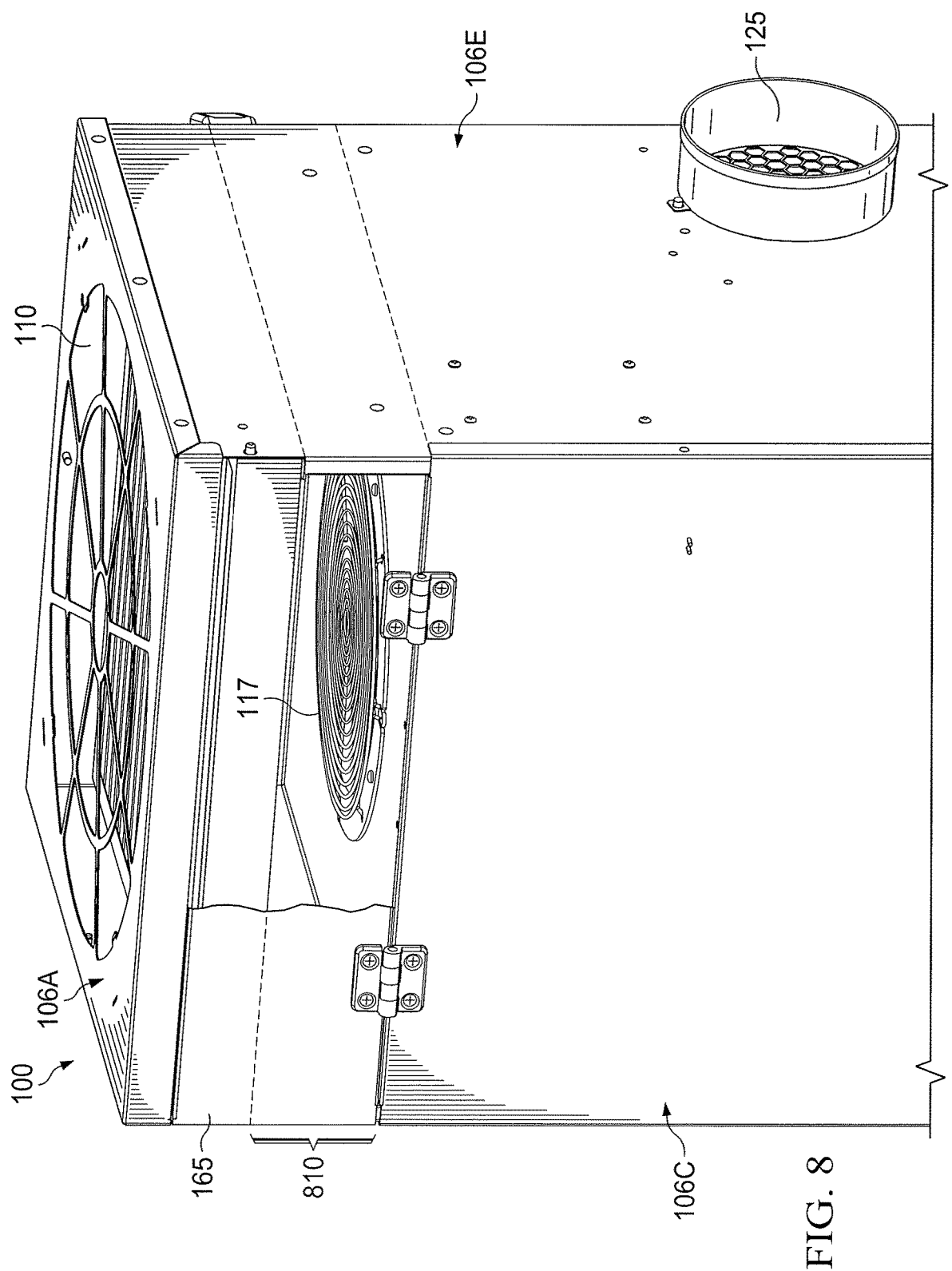
FIG. 8 illustrates a storage compartment of the portable desiccant dehumidifier of FIGS. 1-5, according to certain embodiments.
Figure 9:
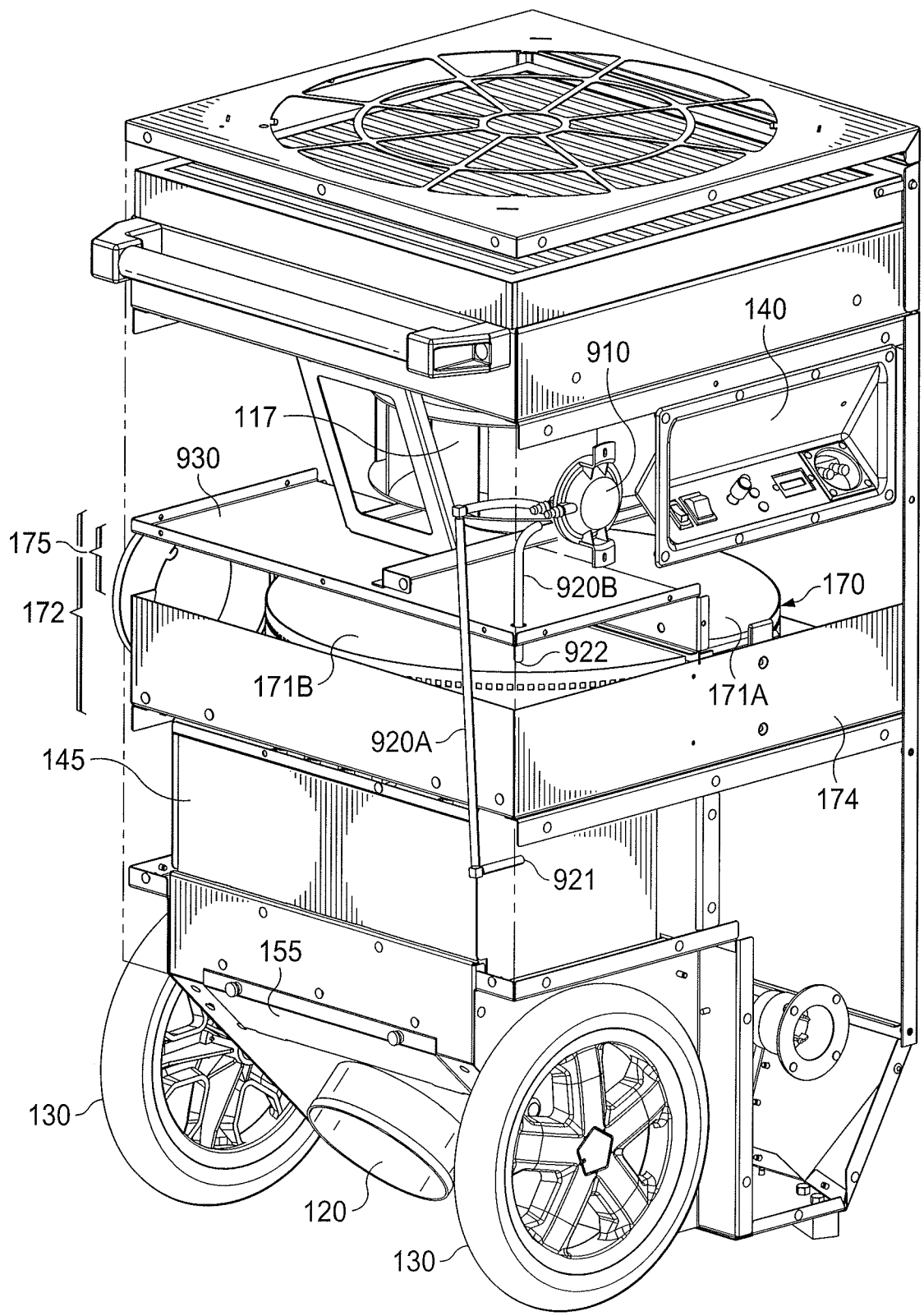
FIG. 9 illustrates a pressure sensing system of the portable desiccant dehumidifier of FIGS. 1-5, according to certain embodiments.
Figure 10:
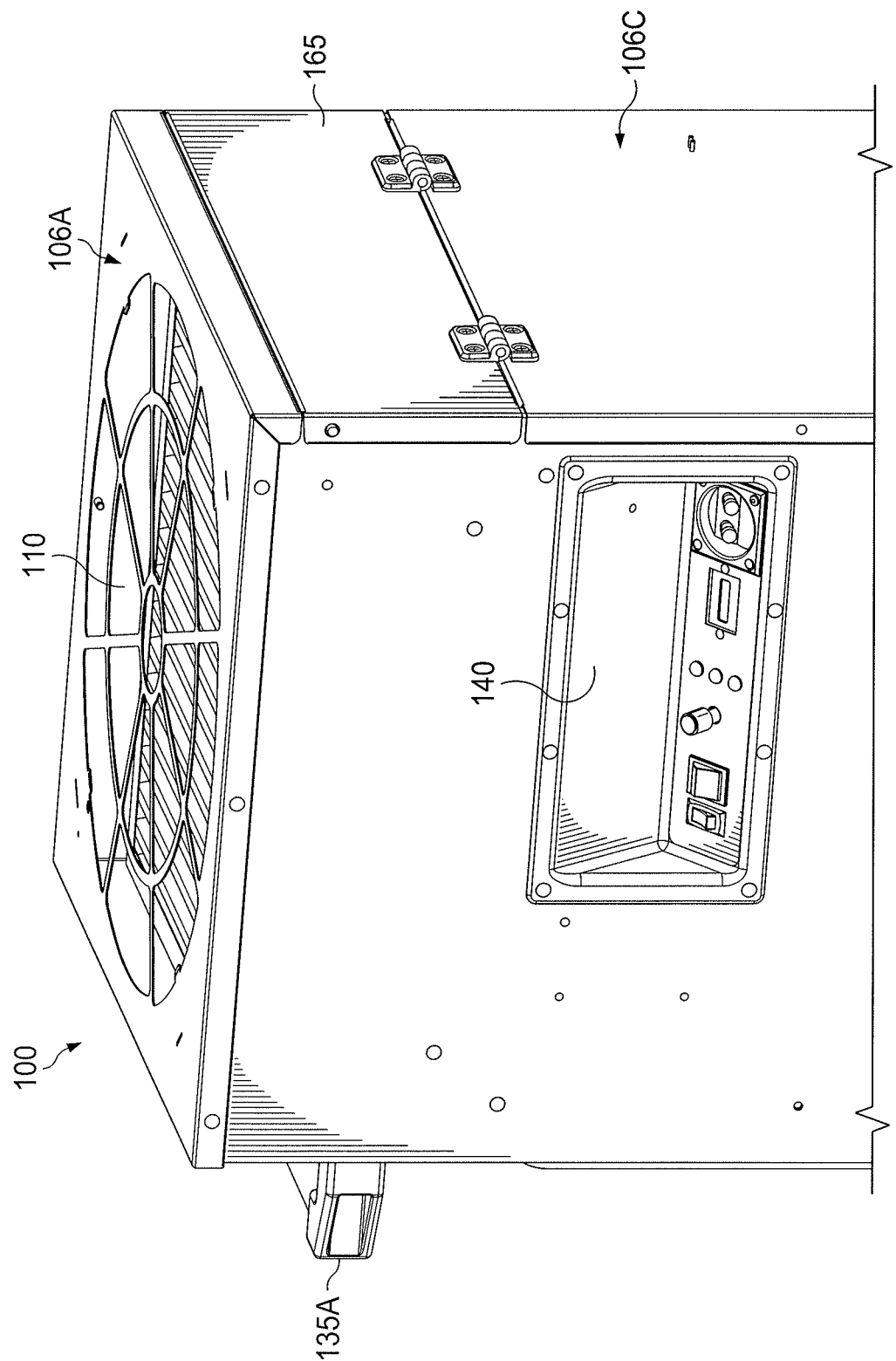
FIGS. 10-11 illustrate a control panel of the portable desiccant dehumidifier of FIGS. 1-5, according to certain embodiments.
Figure 11:
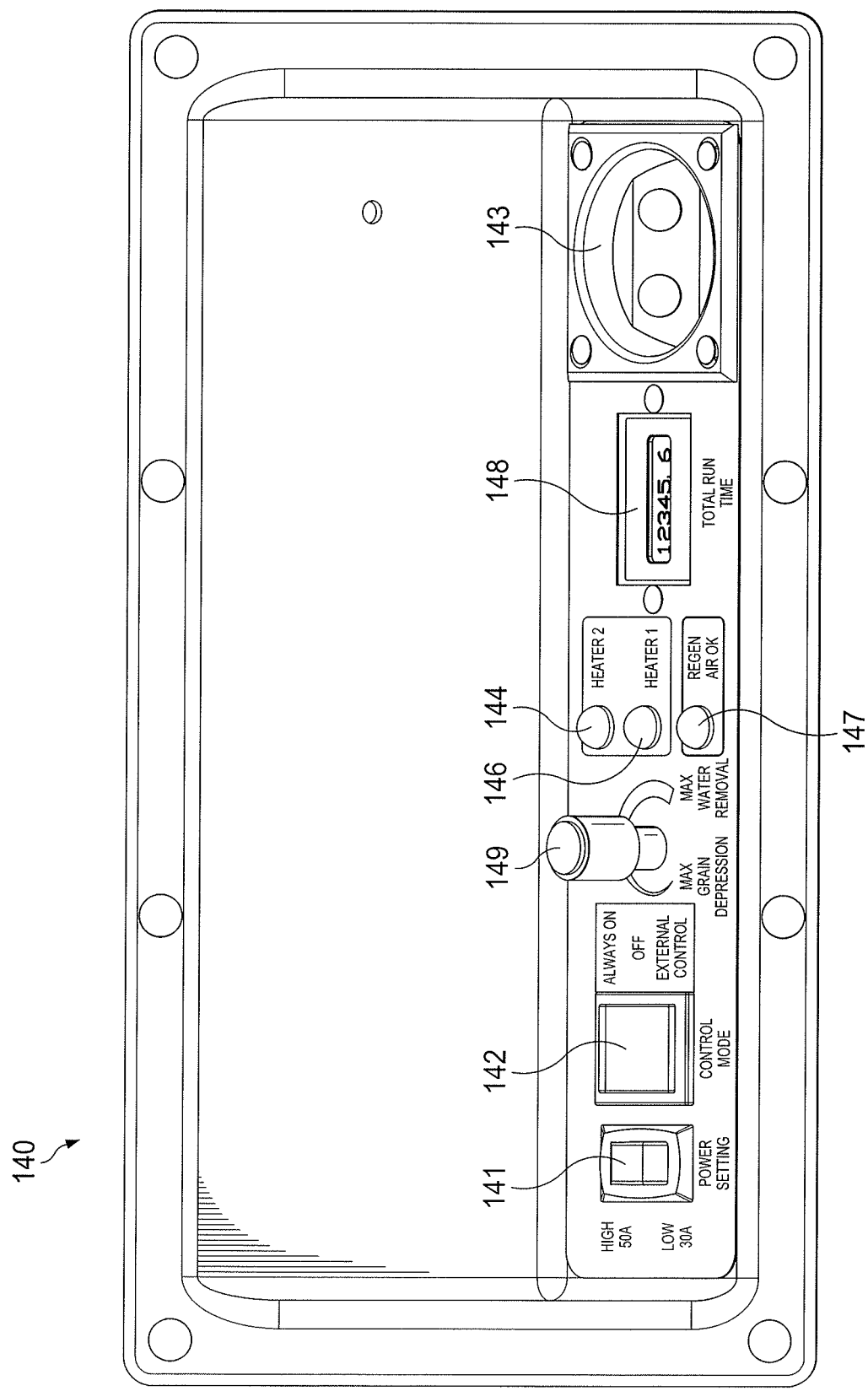
Figure 12:
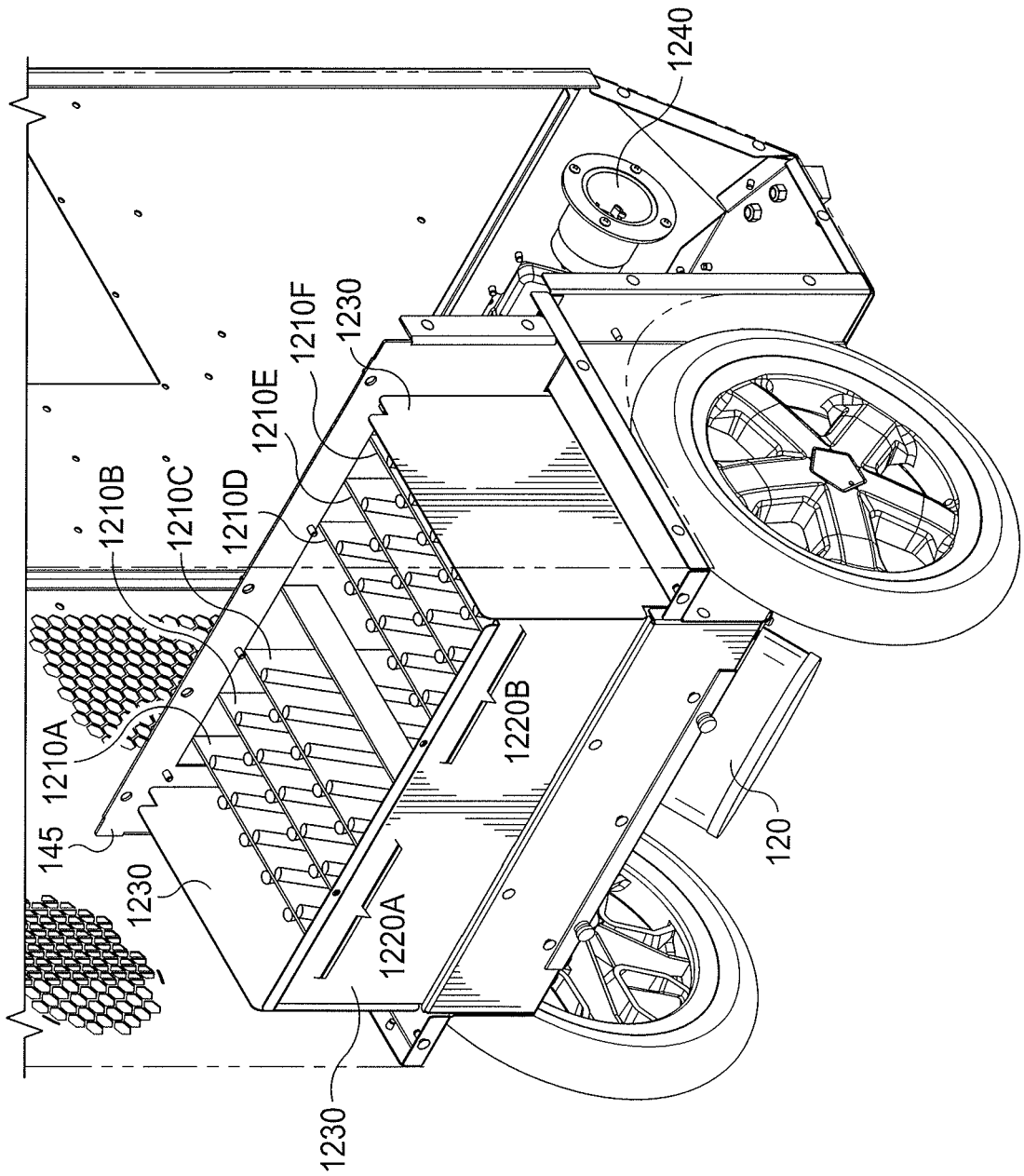
FIG. 12 illustrates a heater of the portable desiccant dehumidifier of FIGS. 1-5, according to certain embodiments.
Figure 13:
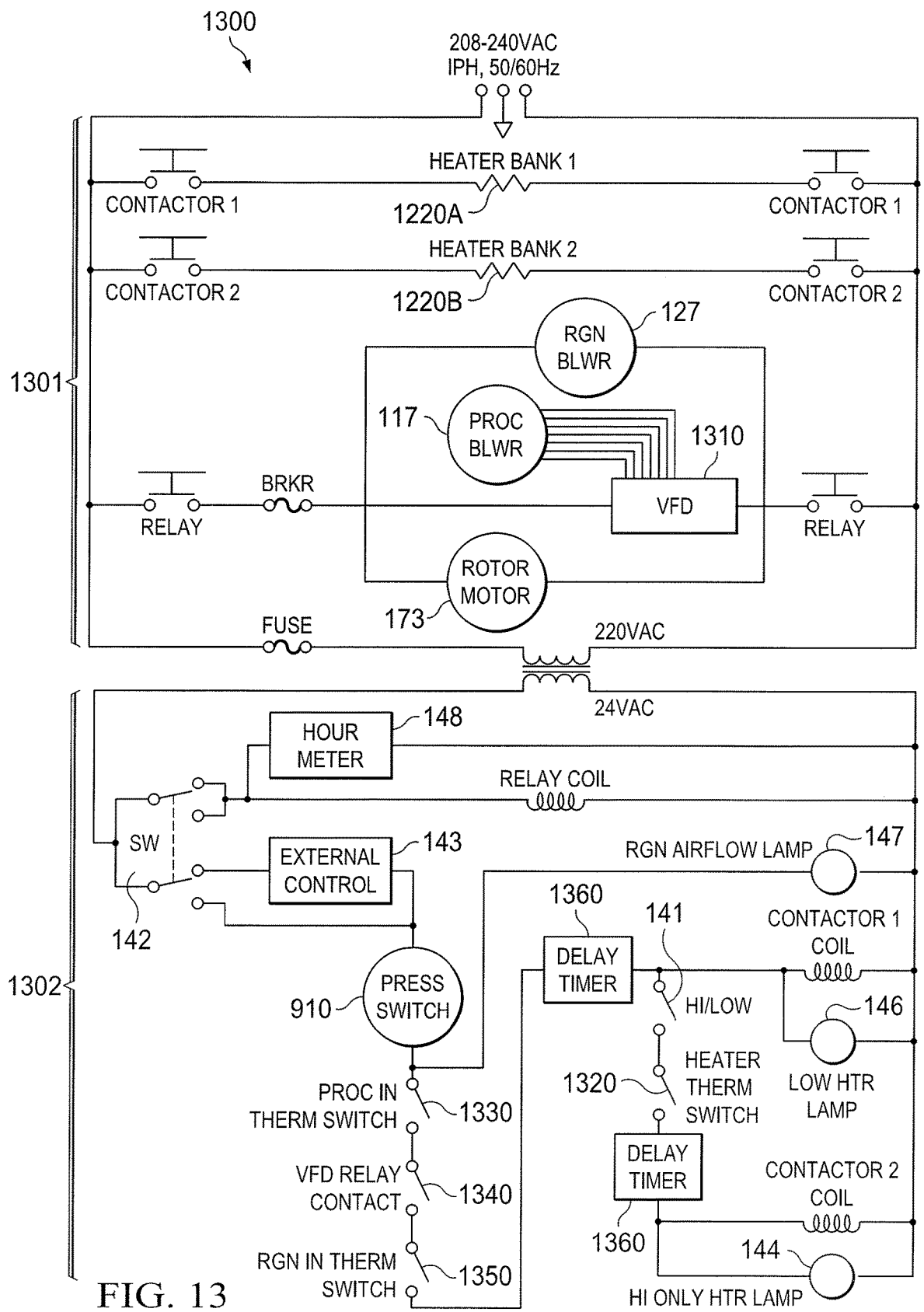
FIG. 13 illustrates an electrical circuit of the portable desiccant dehumidifier of FIGS. 1-5, according to certain embodiments.
Figure 14:
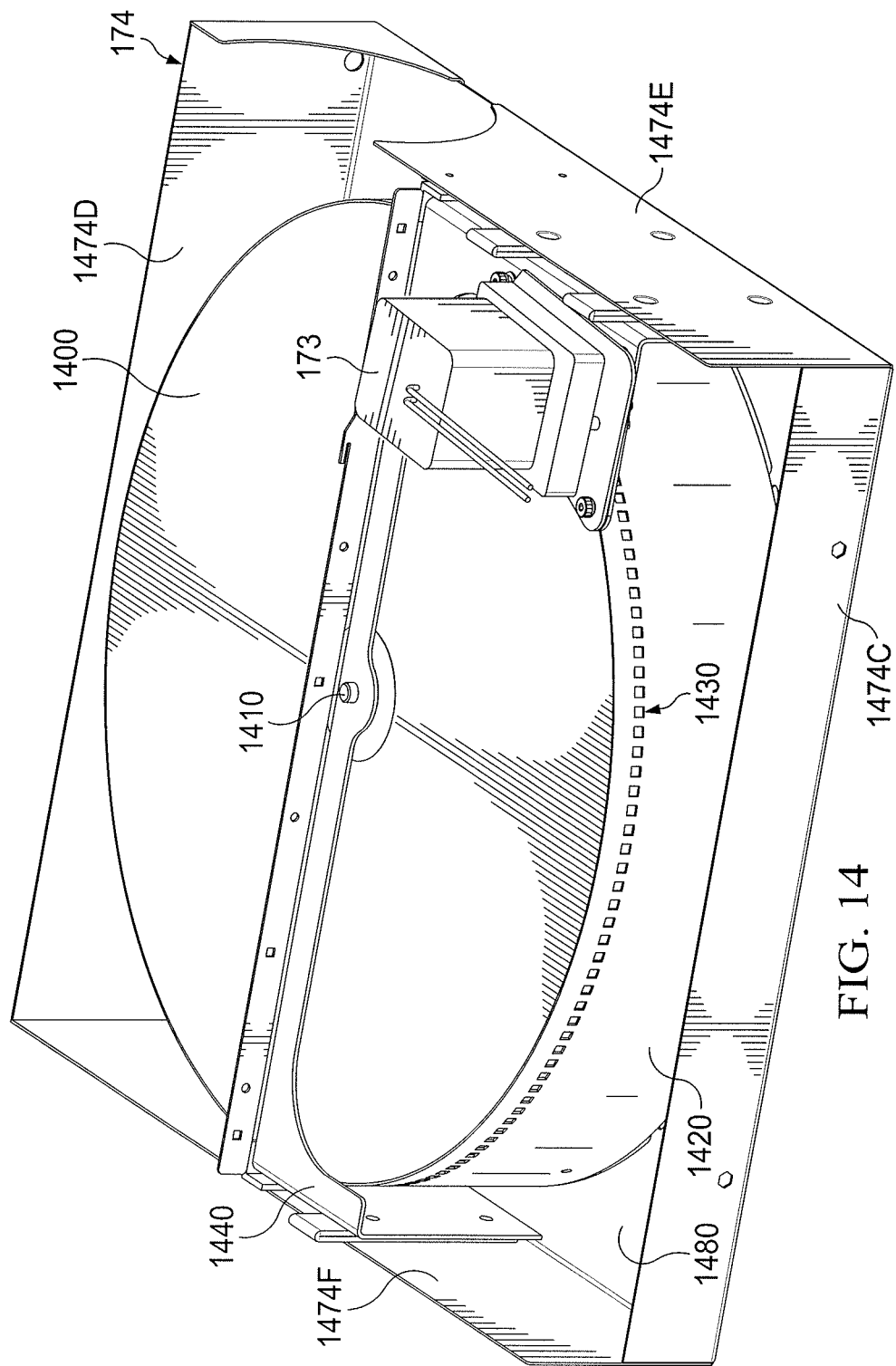
FIG. 14 illustrates a desiccant wheel of the portable desiccant dehumidifier of FIGS. 1-5, according to certain embodiments.
Figure 15:
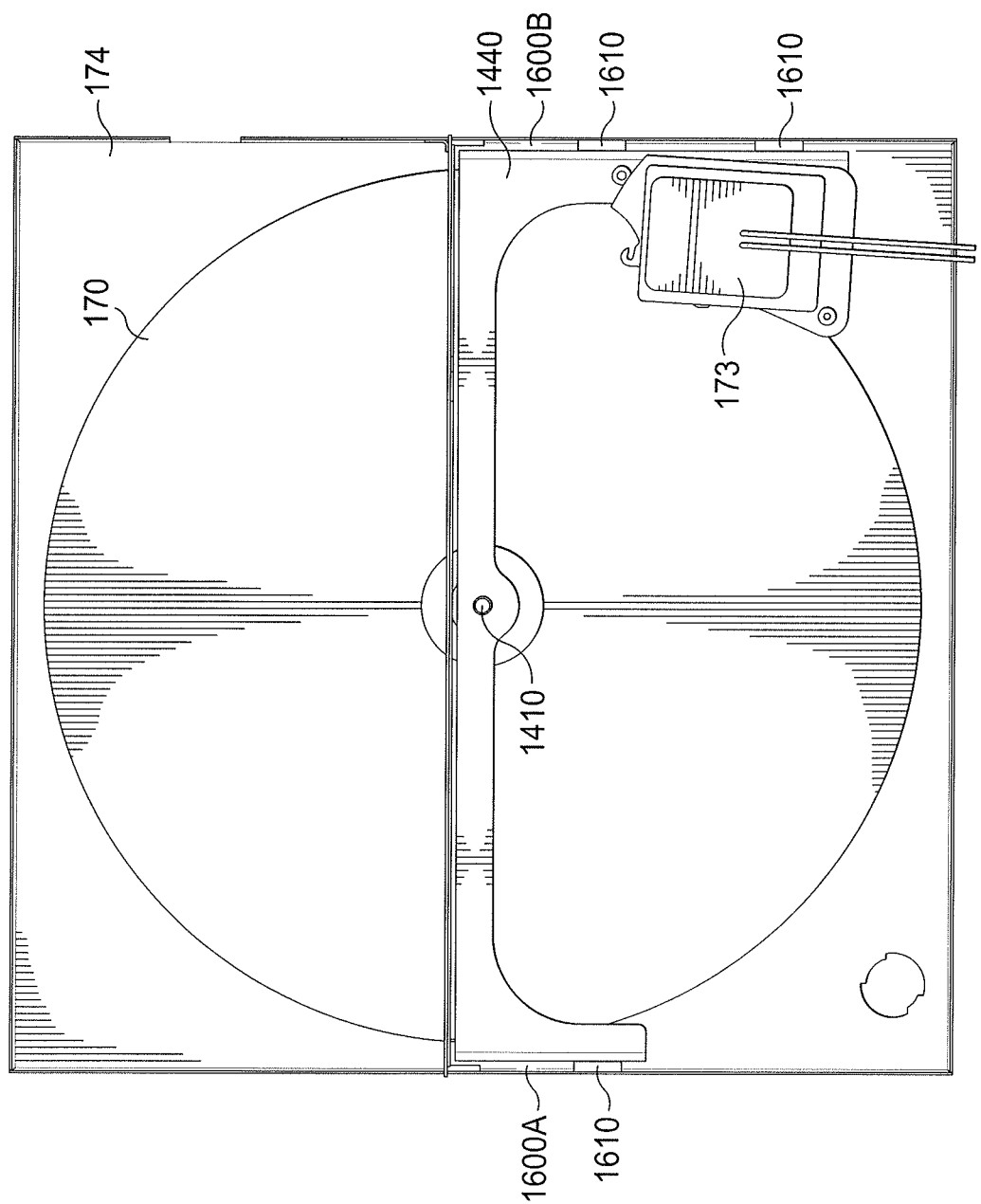
FIGS. 15-16 illustrate a side seal of the desiccant wheel of FIGS. 14-15, according to certain embodiments.
Figure 16:
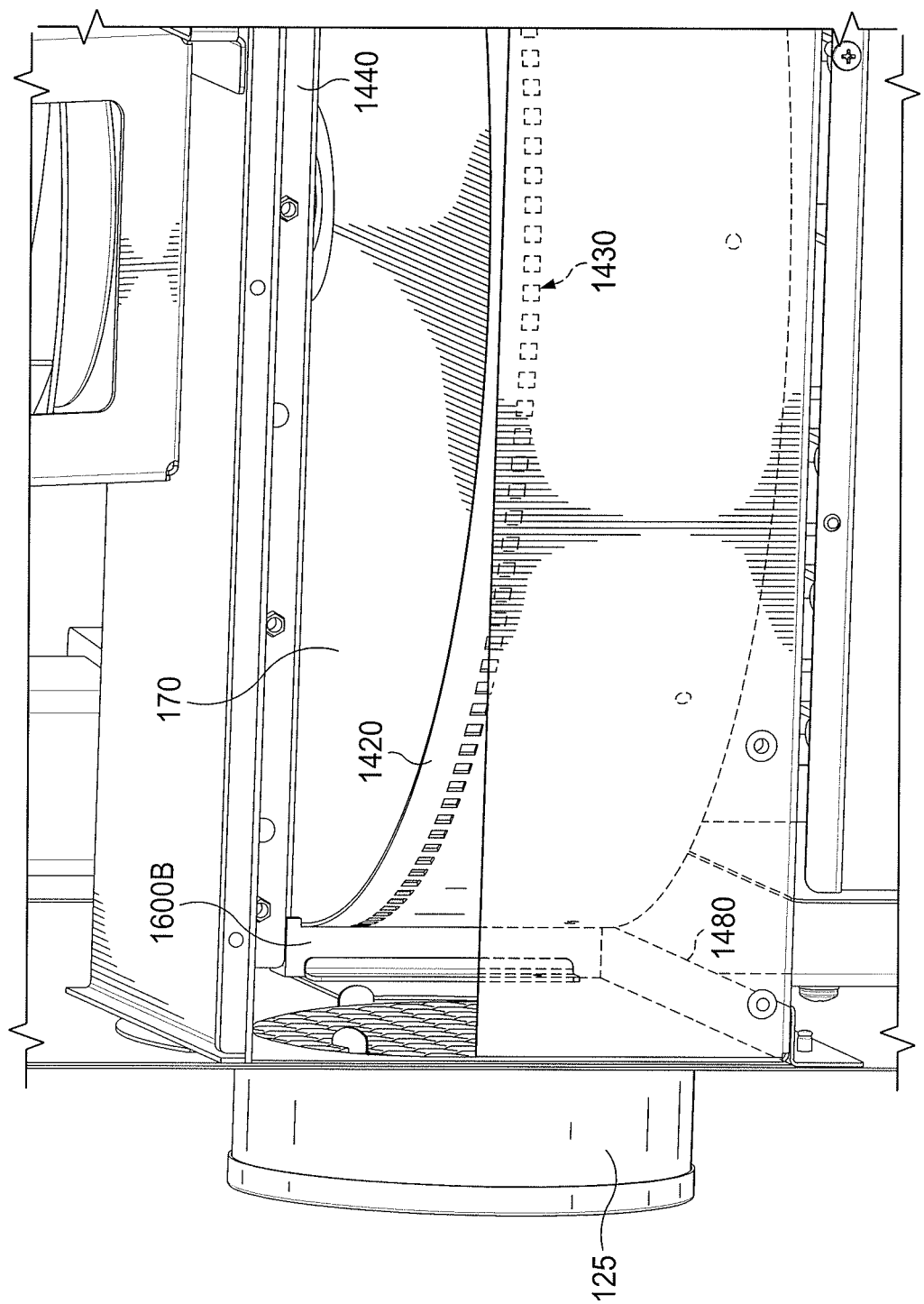
Figure 17:
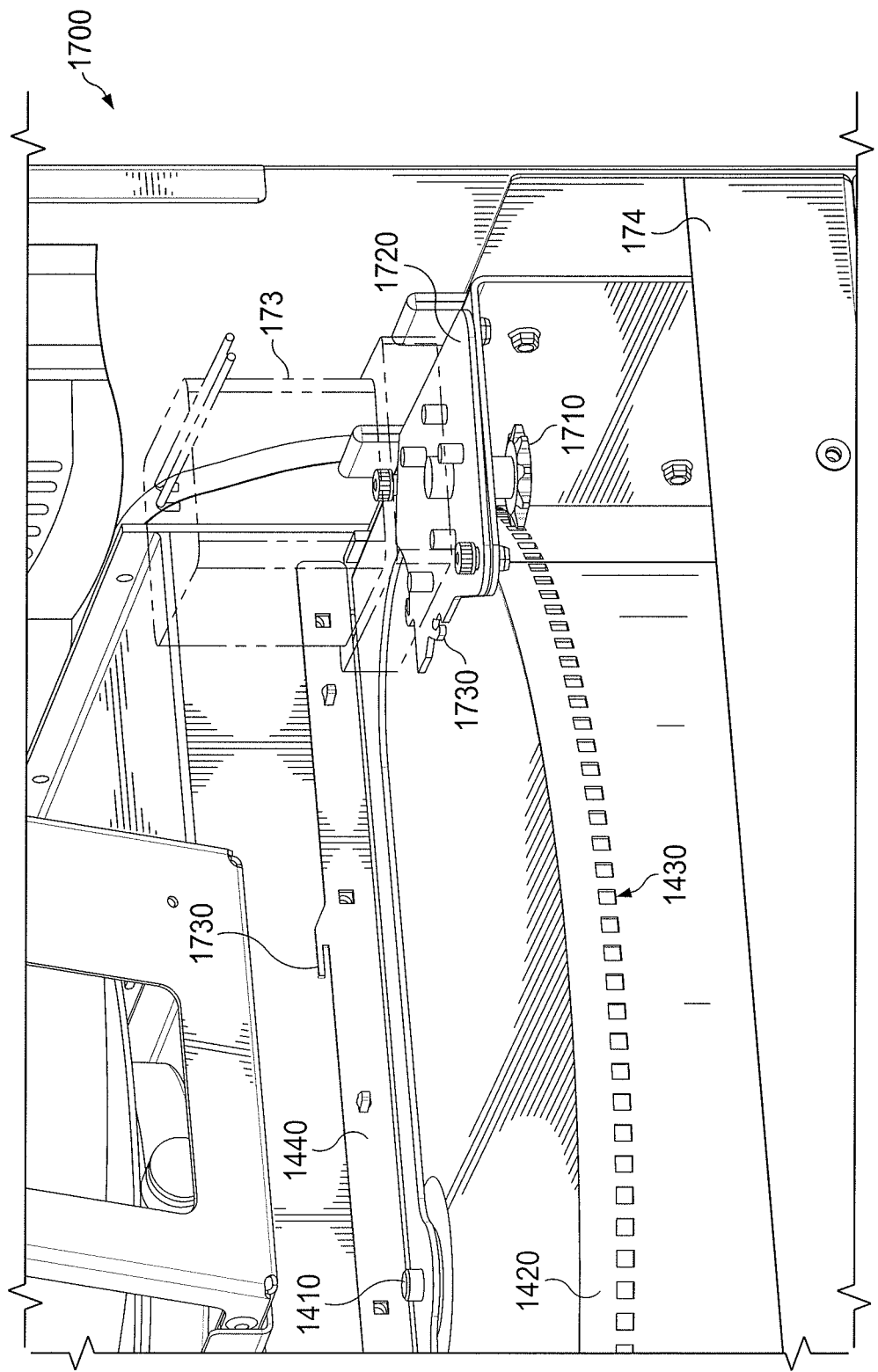
FIG. 17 illustrates a drive mechanism of the desiccant wheel of FIGS. 14-15, according to certain embodiments.

These and other advantages and features of certain embodiments are discussed in more detail below in reference to FIGS. 1-17. FIGS. 1-5 illustrate various perspective views of certain embodiments of a portable desiccant dehumidifier; FIG. 6 illustrates a cut-away side view of a portion of certain embodiments of a portable desiccant dehumidifier; FIG. 7 illustrates airflow patterns through a desiccant wheel of certain embodiments of a portable desiccant dehumidifier; FIG. 8 illustrates a storage compartment of certain embodiments of a portable desiccant dehumidifier; FIG. 9 illustrates a pressure sensing system of certain embodiments of a portable desiccant dehumidifier; FIGS. 10-11 illustrate a control panel of certain embodiments of a portable desiccant dehumidifier; FIG. 12 illustrates a heater of certain embodiments of a portable desiccant dehumidifier, FIG. 13 illustrates an electrical circuit of certain embodiments of a portable desiccant dehumidifier; FIG. 14 illustrates a desiccant wheel of certain embodiments of a portable desiccant dehumidifier; FIGS. 15-16 illustrate a side seal of the desiccant wheel of FIG. 14; and FIG. 17 illustrates a drive mechanism of certain embodiments of a portable desiccant dehumidifier.

FIGS. 1-6 illustrate various perspective views of a portable desiccant dehumidifier 100, according to certain embodiments. In some embodiments, portable desiccant dehumidifier 100 includes a cabinet 105, a process airflow inlet 110, a process airflow outlet 115, a reactivation airflow inlet 120, a reactivation airflow outlet 125, two or more wheels 130, one or more handles 135, and a desiccant 170. While a specific arrangement of these and other components of portable desiccant dehumidifier 100 are illustrated in these figures, other embodiment may have other arrangements and may have more or fewer components than those illustrated.

In general, portable desiccant dehumidifier 100 provides dehumidification to an area (e.g., a room, a floor, etc.) by moving air through portable desiccant dehumidifier 100. To dehumidify air, portable desiccant dehumidifier 100 generates a process airflow 101 that enters cabinet 105 via process airflow inlet 110, travels through a portion of desiccant 170 (e.g., one side of desiccant 170) where it is dried, and then exits cabinet 105 via process airflow outlet 115. To dry desiccant 170 so that it may continue to provide dehumidification to process airflow 101, portable desiccant dehumidifier 100 generates a reactivation airflow 102. Reactivation airflow 102 enters cabinet 105 via reactivation airflow inlet 120, travels through a portion of desiccant 170 (e.g., the opposite side of desiccant 170 from where reactivation airflow 102 flows) where it provides drying to desiccant 170, and then exits cabinet 105 via reactivation airflow outlet 125.

As described in more detail below, the unique arrangement of process airflow inlet 110, process airflow outlet 115, reactivation airflow inlet 120, reactivation airflow outlet 125, and desiccant 170 provides many advantages over existing dehumidifiers. For example, portable desiccant dehumidifier 100 may be more compact and therefore may be available for use in more applications. In addition, process airflow 101 may in some embodiments have a uniform temperature (e.g., from top to bottom and left to right) as it exits portable desiccant dehumidifier 100. This may allow portable desiccant dehumidifier 100 to be used to dry sensitive areas affected by water (e.g., wood floors).

Cabinet 105 may be any appropriate shape and size. In some embodiments, cabinet 105 includes multiple sides 106. For example, some embodiments of cabinet 105 include a top side 106A, a bottom side 106B, a front side 106C, a back side 106D, a right side 106E, and a left side 106F as illustrated in the figures. In some embodiments, process airflow inlet 110 is on top side 106A, and both process airflow outlet 115 and reactivation airflow outlet 125 are on right side 106E.

Process airflow inlet 110 is generally any opening in which process airflow 101 enters portable desiccant dehumidifier 100. In some embodiments, process airflow inlet 110 is round in shape as illustrated. In other embodiments, process airflow inlet 110 may have any other appropriate shape or dimensions. In some embodiments, a removable air filter may be installed proximate to process airflow inlet 110 to filter process airflow 101 as it enters portable desiccant dehumidifier 100. In some embodiments, process airflow inlet 110 is located on top side 106A as illustrated in FIGS. 1-5, but may be in any other appropriate location on other embodiments of portable desiccant dehumidifier 100.

Process airflow outlet 115 is generally any opening in which process airflow 101 exits portable desiccant dehumidifier 100 after it has passed through desiccant 170 for dehumidification. In some embodiments, process airflow outlet 115 is a honeycomb shape as illustrated. In other embodiments, process airflow outlet 115 may have any other appropriate shape or dimensions. In some embodiments, process airflow outlet 115 is located on right side 106E as illustrated in FIGS. 1-6, but may be in any other appropriate location on other embodiments of portable desiccant dehumidifier 100.

Portable desiccant dehumidifier 100 includes a process airflow fan 117 that, when activated, draws process airflow 101 into portable desiccant dehumidifier 100 via process airflow inlet 110, causes process airflow 101 to flow through a portion of desiccant 170 for dehumidification, and exhausts process airflow 101 out of process airflow outlet 115. In some embodiments, process airflow fan 117 is located within cabinet 105 proximate to process airflow inlet 110 as illustrated in FIGS. 7-9. Process airflow fan 117 may be any type of air mover (e.g., axial fan, forward inclined impeller, backward inclined impeller, etc.) that is configured to generate process airflow 101 that flows through a first portion of desiccant 170 for dehumidification and exits portable desiccant dehumidifier 100 through process airflow outlet 115.

Reactivation airflow inlet 120 is generally any opening in which reactivation airflow 102 enters portable desiccant dehumidifier 100. In some embodiments, reactivation airflow inlet 120 is round in shape as illustrated. In other embodiments, reactivation airflow inlet 120 may have any other appropriate shape or dimensions. In some embodiments, a removable air filter (at location 150 in FIG. 6) may be installed proximate to reactivation airflow inlet 120 to filter reactivation airflow 120 as it enters portable desiccant dehumidifier 100. In some embodiments, a reactivation airflow door 155, which is illustrated in FIGS. 6 and 9, is provided to allow for easy access to the removable filter proximate to reactivation airflow inlet 120. In some embodiments, reactivation airflow inlet 120 is located on bottom side 106B at least partially between wheels 130 as illustrated in FIGS. 1-5, but may be in any other appropriate location on other embodiments of portable desiccant dehumidifier 100.

Reactivation airflow outlet 125 is generally any opening in which reactivation airflow 102 exits portable desiccant dehumidifier 100 after it has passed through a heater 145 and a portion of desiccant 170. In some embodiments, reactivation airflow outlet 125 is round in shape as illustrated. In other embodiments, reactivation airflow outlet 125 may have any other appropriate shape or dimensions. In some embodiments, reactivation airflow outlet 125 is located on right side 106E as illustrated in FIGS. 1-6, but may be in any other appropriate location on other embodiments of portable desiccant dehumidifier 100. As described in more detail below with respect to FIG. 7, portable desiccant dehumidifier 100 may include a reactivation airflow plenum 175 located proximate to reactivation airflow outlet 125. In some embodiments, reactivation airflow 102 flows through desiccant 170 and into reactivation airflow plenum 175 before it exits cabinet 105 via reactivation airflow outlet 125. In some embodiments, as described in more detail below, the height of reactivation airflow outlet 125 is greater than the height of reactivation airflow plenum 175, which allows a more compact design for portable desiccant dehumidifier 100, thereby allowing portable desiccant dehumidifier 100 to be used for more applications.

Portable desiccant dehumidifier 100 also includes a reactivation airflow fan 127 that is configured to generate reactivation airflow 102 that flows through heater 145 and a portion of desiccant 170 in order to dry desiccant 170. Reactivation airflow fan 127, which is illustrated in FIG. 6, may be located proximate to reactivation airflow inlet 120 as illustrated and may be any appropriate type of air mover (e.g., axial fan, forward inclined impeller, backward inclined impeller, etc.).

Embodiments of portable desiccant dehumidifier 100 may include two or more wheels 130. In some embodiments, portable desiccant dehumidifier 100 includes two wheels 130 as illustrated that permit portable desiccant dehumidifier 100 to be tilted towards back side 106D and easily transported to a new location. Wheels 130 may be of any size and be made of any appropriate materials. In some embodiments, reactivation airflow inlet 120 is located at least partially between two wheels 130 as illustrated.

Some embodiments of portable desiccant dehumidifier 100 may include one or more handles 135. For example, certain embodiments may include a main handle 135A and a secondary handle 135B. Main handle 135A may be used to tilt portable desiccant dehumidifier 100 towards back side 106D and rolled to a new location. Secondary handle 135B may be used, for example, when loading portable desiccant dehumidifier 100 into a transport vehicle.

Embodiments of portable desiccant dehumidifier 100 also include a control panel 140 located in cabinet 105. In general, control panel 140 provides various controls for an operator to control certain functions of portable desiccant dehumidifier 100. Certain embodiments of control panel 140 are discussed in more detail below in reference to FIGS. 10-11. In some embodiments, control panel 140 is recessed into cabinet 105 as illustrated in order to allow for portable desiccant dehumidifier 100 to be easily transported. In some embodiments, a portion of control panel 140 is at least partially within process airflow 101, as illustrated in more detail in FIG. 7. For example, the back side of control panel 140 (i.e., the side opposite the portion of control panel 140 that is visible from the outside of cabinet 105) may be at least partially within process airflow 101 before it enters desiccant 170. This may provide cooling for any electronic components within control panel 140, thereby allowing certain embodiments of control panel 140 to function without any additional cooling mechanisms (e.g., additional fans or heatsinks). This may decrease the amount of electrical power required by portable desiccant dehumidifier 100 and improve its overall efficiency. While control panel 140 is located on left side 106F in some embodiments, control panel 140 may be located in any appropriate location on cabinet 105.

Embodiments of portable desiccant dehumidifier 100 also include a heater 145 that is configured to heat reactivation airflow 102 before it enters desiccant 170. This provides drying to desiccant 170 and allows it to provide further dehumidification to process airflow 101. In some embodiments, heater 145 is generally located proximate to reactivation airflow fan 127 so as to heat reactivation airflow 102 after it leaves reactivation airflow fan 127 but before it enters the bottom side of desiccant 170. Heater 145 may be closely spaced with reactivation airflow fan 127 in order to enable portable desiccant dehumidifier 100 to have a more compact design. In some embodiments, heater 145 is a single-cartridge heater assembly that is easily removable from portable desiccant dehumidifier 100. In some embodiments, heater 145 includes a double-wall heater box that keeps cabinet 105 cool from radiant energy generated by heater 145. Particular embodiments of heater 145 are discussed below in reference to FIG. 12.

Figure 1:
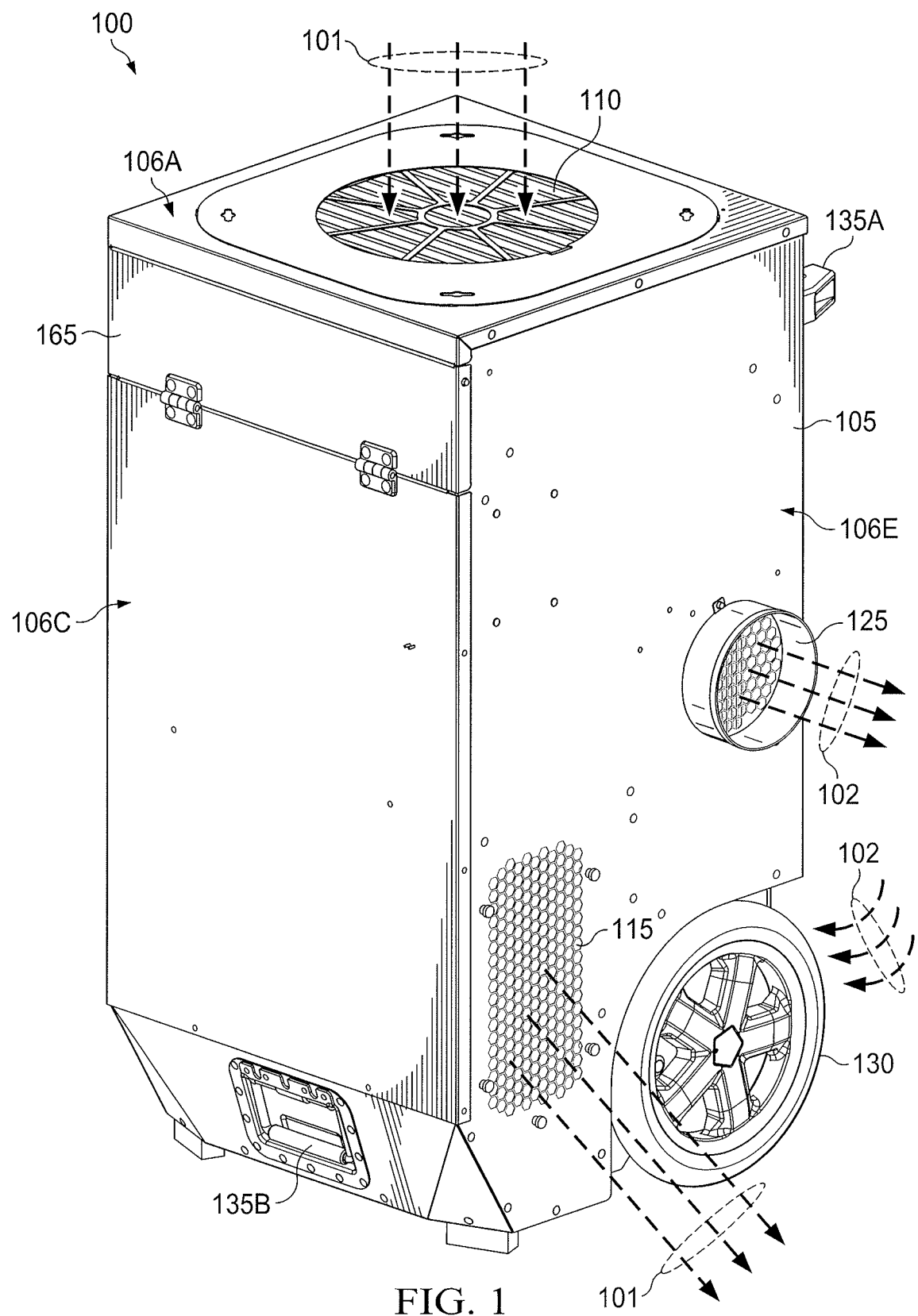
FIGS. 1-5 illustrate various perspective views of a portable desiccant dehumidifier, according to certain embodiments.
Figure 2:
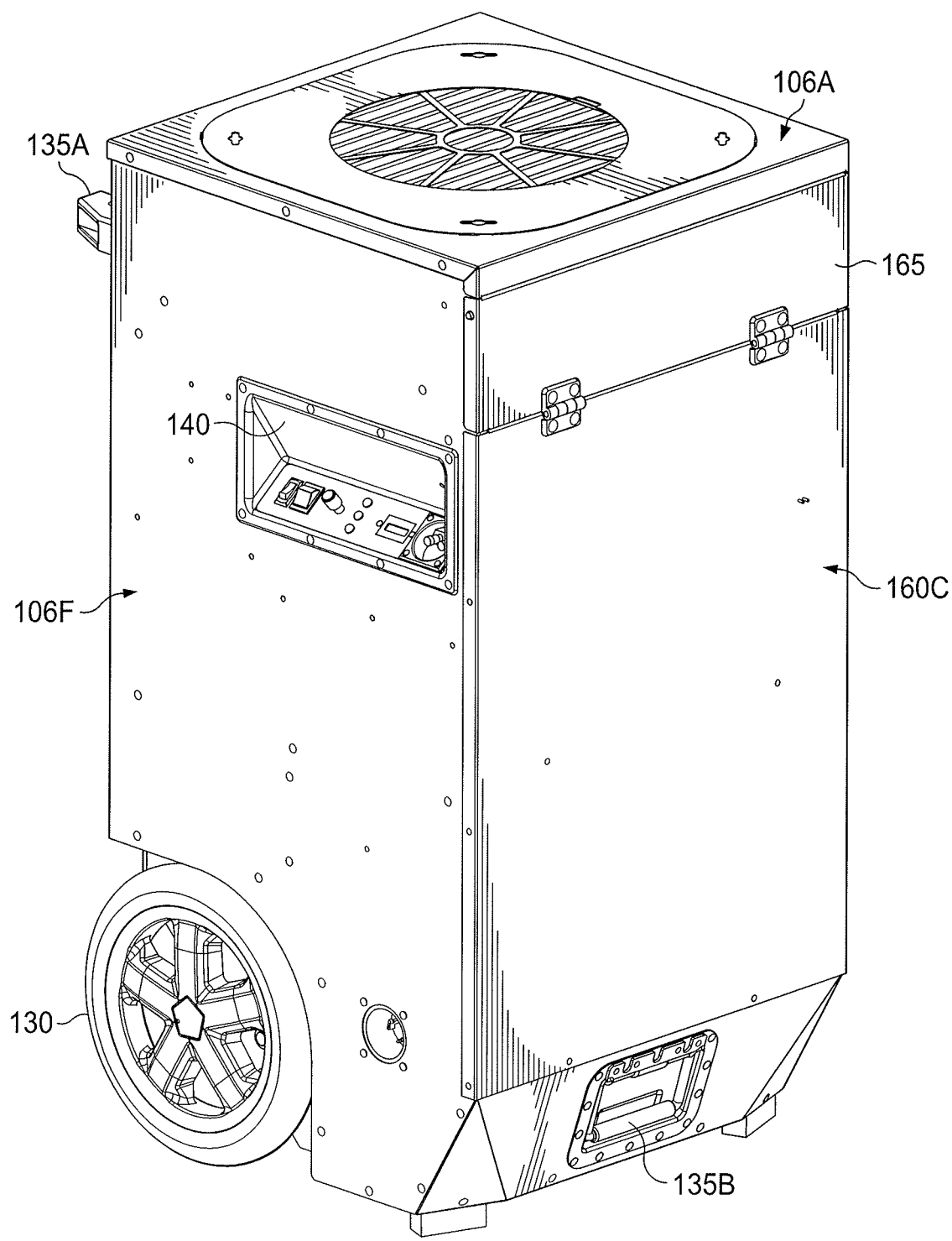
Figure 3:
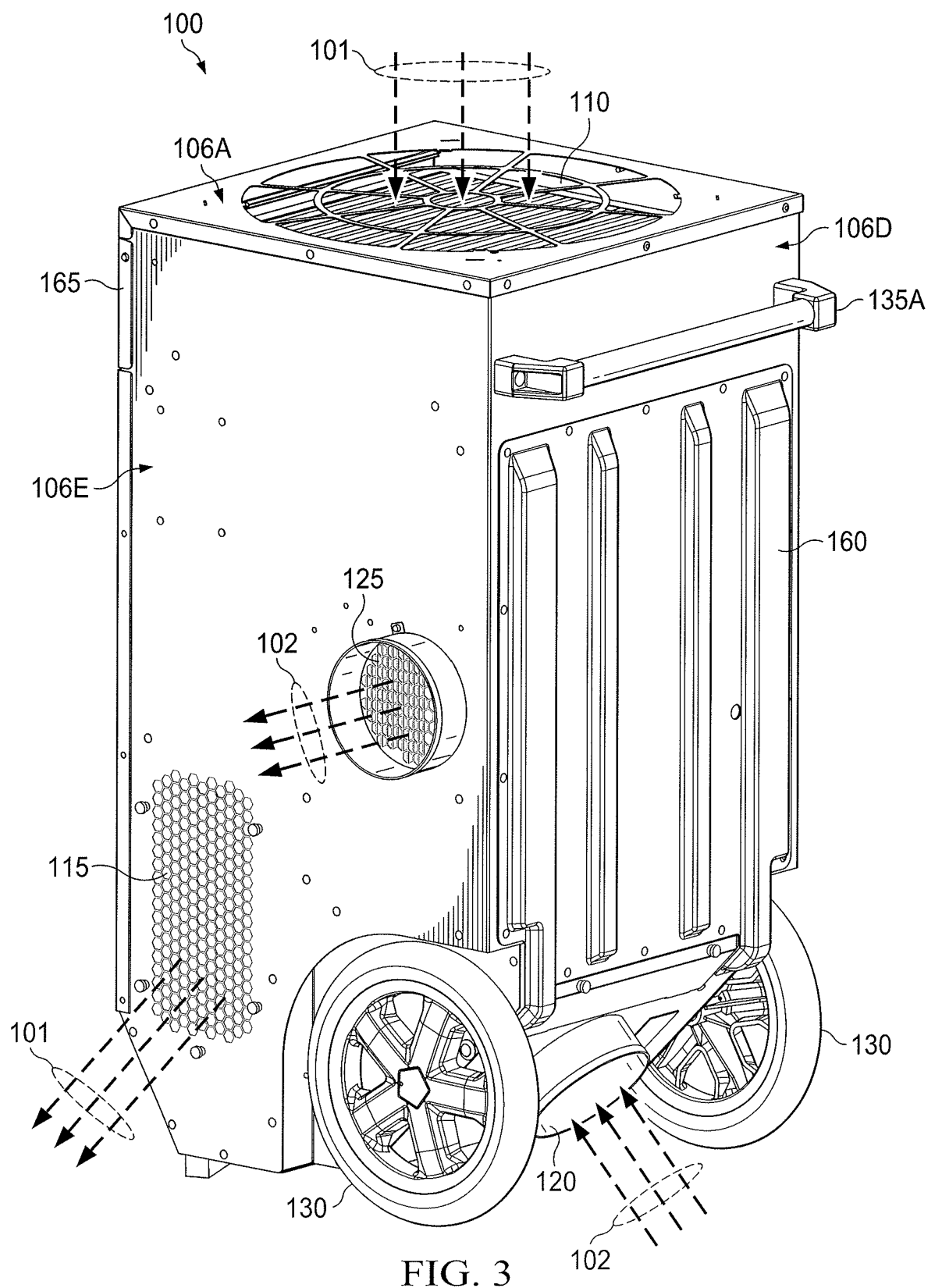

In some embodiments, portable desiccant dehumidifier 100 includes a skid plate 160 that is coupled to a side 106 of cabinet 105. In some embodiments, skid plate 160 is coupled to back side 106D as illustrated. In general, skid plate 160 made be made of any appropriate material (e.g., plastic, metal, etc.) and permits portable desiccant dehumidifier 100 to be positioned in such a way that skid plate 160 is resting on the ground or floor, as illustrated in FIGS. 4-5. This, along with the unique configuration of process airflow inlet 110, process airflow outlet 115, reactivation airflow inlet 120, reactivation airflow outlet 125, and main handle 135A, permits portable desiccant dehumidifier 100 to operate in either the upright (e.g., FIGS. 1-3) or horizontal (e.g., FIGS. 4-5) positions. This provides additional flexibility to portable desiccant dehumidifier 100 and permits it to be used in a wide range of applications. In some embodiments, as discussed in more detail below in reference to FIG. 9, a portion of a tube 920A for sensing pressure is sandwiched between cabinet 105 and skid plate 160 in order to protect tube 920A. For example, skid plate 160 may include one or more raised grooves as illustrated in FIG. 3, and tube 920A may run within a portion of one of the raised grooves.

In some embodiments, portable desiccant dehumidifier 100 includes a storage compartment door 165 that is couple to cabinet 105. As discussed in more detail below in reference to FIG. 8, storage compartment door 165 is configured to provide access to storage compartment 810. In some embodiments, storage compartment door 165 may be located on front side 106C of cabinet 105 and may be attached to cabinet 105 via one or more hinges.

Portable desiccant dehumidifier 100 also includes a desiccant 170. In general, desiccant 170 is made of any appropriate material (e.g., activated alumina, silica gel, molecular sieve, etc.) that is capable of absorbing moisture from process airflow 101, thereby providing dehumidification to process airflow 101. In some embodiments, desiccant 170 is wheel-shaped as illustrated in FIGS. 7 and 9 and rotates in either a clockwise or counter-clockwise motion when viewed from above. This shape allows one portion of desiccant 170 (e.g., one side of the desiccant wheel) to be within process airflow 101 and another portion (e.g., the opposite side of the desiccant wheel) to be within reactivation airflow 102 at the same time. The rotation of desiccant 170 permits desiccant 170 to provide continuous dehumidification to process airflow 101 since portions that absorb moisture are then rotated to reactivation airflow 102 where they are dried and then returned to process airflow 101.

As discussed in more detail below in reference to FIG. 12, a counter-clockwise rotation of desiccant 170 when viewed from top side 106A provides certain benefits such as a uniform temperature to process airflow 101 as it exits process airflow outlet 115. This may allow portable desiccant dehumidifier 100 to be used to dry sensitive areas affected by water (e.g., wood floors). In other embodiments, as discussed below, desiccant 170 may rotate in a clockwise direction when viewed from top side 106A. While a clockwise rotation may not provide a uniform temperature to process airflow 101, such a rotation may provide other benefits such as optimized dehumidification when portable desiccant dehumidifier 100 is operating in a low power mode (as discussed below).

In operation, portable desiccant dehumidifier 100 generates two different airflows to provide dehumidification: process airflow 101 and reactivation airflow 102. Process airflow 101, which is generated by process airflow fan 117, enters cabinet 105 via process airflow inlet 110. Process airflow 101 flows through a portion of desiccant 170 and then exits cabinet 105 via process airflow outlet 115. As process airflow 101 flows through desiccant 170, moisture is removed from process airflow 101 and captured by desiccant 170, thereby providing dehumidification to process airflow 101. To dry the portion of desiccant 170 that has captured moisture from process airflow 101, portable desiccant dehumidifier 100 generates reactivation airflow 102. Reactivation airflow 102, which is generated by reactivation airflow fan 127, enters cabinet 105 via reactivation airflow inlet 120. Reactivation airflow 102 flows through heater 145 where it is heated. It then flows through a portion of desiccant 170 and then exits cabinet 105 via reactivation airflow outlet 125. As the heated reactivation airflow 102 flows through desiccant 170, moisture is removed from desiccant 170, thereby drying desiccant 170 where it can again capture moisture from process airflow 101.

FIG. 7 illustrates airflow patterns through desiccant 170 of portable desiccant dehumidifier 100. In some embodiments, as illustrated in this figure, desiccant 170 is wheel-shaped and is contained within a removable desiccant cassette 174. In certain embodiments, wheel-shaped desiccant 170 is oriented within desiccant cassette 174 such that its flat sides are parallel with top side 106A of cabinet 105. Desiccant cassette 174 may be easily inserted into and removed from a desiccant compartment 172 of cabinet 105. This may permit desiccant 170 to be readily accessible for replacement or inspection.

In general, process airflow 101 and reactivation airflow 102 flow through respective portions 171 (i.e., first portion 171A and second portion 171B, respectively) of desiccant 170 within desiccant compartment 172 in order to provide dehumidification to process airflow 101. First portion 171A of desiccant 170 absorbs moisture from process airflow 101, thereby providing dehumidification to process airflow 101 before it exits portable desiccant dehumidifier 100. Second portion 171B is dried by reactivation airflow 102 that has been heated by heater 145. Desiccant 170 rotates about an axis (not illustrated) that runs from top side 106A to bottom side 106B in order to continuously move dried portions of desiccant 170 into process airflow 101 and to move wet portions of desiccant 170 into reactivation airflow 102. As a result, portable desiccant dehumidifier 100 provides continuous dehumidification for process airflow 101.

In general, desiccant compartment 172 is a portion of cabinet 105 that houses desiccant cassette 174 and desiccant 170. In some embodiments, desiccant compartment 172 is rectangular in shape as illustrated and has a height as illustrated with notation 172 in FIG. 7. In some embodiments, desiccant compartment 172 includes a reactivation airflow plenum 175 directly above second portion 171B of desiccant 170. Reactivation airflow plenum 175 is generally an empty space within desiccant compartment 172 and has a height as illustrated with notation 175 in FIG. 7. Reactivation airflow 102 enters reactivation airflow plenum 175 after it exits second portion 171B of desiccant 170. Once reactivation airflow 102 enters reactivation airflow plenum 175, it then exits portable desiccant dehumidifier 100 through reactivation airflow outlet 125.

In order to rotate desiccant 170 within desiccant compartment 172, embodiments of portable desiccant dehumidifier 100 include a desiccant motor 173. Desiccant motor 173 may be any DC or AC electrical motor that is capable of causing desiccant 170 to rotate. In some embodiments, desiccant motor 173 is capable of varying the speed and direction in which desiccant 170 rotates. In certain embodiments, desiccant motor 173 is coupled to a drive mechanism that causes desiccant 170 to rotate. For example, desiccant 170 may be perforated with a line of holes around its perimeter as illustrated in FIG. 7. Desiccant motor 173 may be coupled to a sprocket that has multiple teeth or cogs that fit into the holes of desiccant 170. By rotating the sprocket, desiccant motor 173 may therefore cause desiccant 170 to rotate. While specific drive mechanisms for desiccant 170 have been described, any other appropriate drive mechanism may be used (e.g., chain, direct drive, etc.).

Desiccant cassette 174 is any appropriate apparatus for housing desiccant 170. Desiccant cassette 174 is generally open on its top side (i.e., its side closest to top side 106A of cabinet 105) and bottom side (i.e., its side closest to bottom side 106B of cabinet 105) in order to permit process airflow 101 and reactivation airflow 102 to flow into and out of desiccant 170. In some embodiments, desiccant cassette 174 may include any aperture of any shape and size that is appropriate for permitting process airflow 101 and reactivation airflow 102 to flow into and out of desiccant 170. In general, desiccant cassette 174 is configured as a tray that is easily removable from portable desiccant dehumidifier 100. For example, a portion of front side 106C of cabinet 105 may be removable in some embodiments. By removing a portion of front side 106C of cabinet 105, an operator may then be able to remove and insert desiccant cassette 174 into desiccant compartment 172.

In some embodiments, as illustrated in FIG. 7, reactivation airflow outlet 125 is located adjacent to desiccant 170. For example, a portion or all of reactivation airflow outlet 125 may be located within desiccant compartment 172. Such a configuration permits reactivation airflow 102 to exit cabinet 105 out of the same space as desiccant 170. This contributes to a more compact design for portable desiccant dehumidifier 100, which is advantageous in applications such as the restoration market.

In some embodiments, reactivation airflow plenum 175 is not the full height of reactivation airflow outlet 125 as illustrated in FIG. 7. More specifically, height 126 of reactivation airflow outlet 125 is greater than the height of reactivation airflow plenum 175 in some embodiments. This minimizes the height needed for desiccant compartment 172, which allows a shorter overall height of portable desiccant dehumidifier 100. At least a portion of reactivation airflow plenum 175 overlaps reactivation airflow outlet 125 so that reactivation airflow 102 may exit reactivation airflow plenum 175 through reactivation airflow outlet 125.

FIG. 8 illustrates a storage compartment 810 of process airflow inlet 110, according to certain embodiments. In general, storage compartment 810 is an empty space within cabinet 105 that is proximate to top side 106A and process airflow inlet 110 that permits process airflow 101 to pass from process airflow inlet 110 through storage compartment 810 and into process airflow fan 117. Storage compartment 810 provides a convenient location for operators to store items needed for the operation of portable desiccant dehumidifier 100. For example, hoses, electrical cords, ducts, and the like may be stored within storage compartment 810 when it is not in operation. In some embodiments, storage compartment door 165 is provided to enclose storage compartment 810 and prevent stored items from falling out of storage compartment 810 during transit. Storage compartment door 165 also prevents air from entering through storage compartment 810, thus bypassing the filter for process airflow inlet 110. This arrangement also forces all process airflow 101 to enter through any ducting connected to process airflow inlet 110, allowing portable desiccant dehumidifier 100 to be located outside the space it is dehumidifying. Storage compartment 810 may have any appropriate dimensions and shape within cabinet 105.

FIG. 9 illustrates a pressure sensing system of portable desiccant dehumidifier 100. In general, the pressure sensing system of portable desiccant dehumidifier 100 senses air pressure at different locations within reactivation airflow 102 in order to detect low reactivation airflow 102 through desiccant 170. Such low reactivation airflow 102 may be caused by, for example, a defective reactivation airflow fan 127, flattened ducting, etc. The pressure sensing system may include a pressure switch 910 and tubes 920A-B.

In some embodiments, pressure switch 910 is a normally open switch that closes on differential pressure rise. In certain embodiments, pressure switch 910 is physically located within process airflow 101 as illustrated in FIG. 9, but may be in other locations in other embodiments. Pressure switch 910 is configured to sense a pressure differential in reactivation airflow 102 between a first location 921 and a second location 922. To do so, two tubes 920 (i.e., 920A-B) may be coupled to pressure switch 910 and may terminate at first location 921 and second location 922, respectively. In some embodiments, first location 921 (high pressure) is anywhere within reactivation airflow 102 inside cabinet 105 prior to where reactivation airflow 102 enters desiccant 170, and second location 922 (low pressure) is anywhere within reactivation airflow 102 inside cabinet 105 after reactivation airflow 102 exits desiccant 170. Such a configuration allows pressure switch 910 to sense air pressure of reactivation airflow 102 both before and after desiccant 170. If pressure switch 910 senses low airflow through desiccant 170 (i.e., differential pressure rise between first location 921 and second location 922), pressure switch 910 closes. When pressure switch 910 closes due to low reactivation airflow 102, heater 145 is deactivated in order to prevent any damage to portable desiccant dehumidifier 100 due to high heat. For example, both heating banks 1220 as described below in FIG. 12 may be deactivated when pressure switch 910 closes due to low reactivation airflow 102. While portable desiccant dehumidifier 100 may include a thermal switch for heater 145 and a thermal switch for process airflow 101 (to detect high temperatures of process airflow 101 due to tenting, recirculating, etc.), these thermal switches may be too slow to respond to low airflow through desiccant 170 due to their thermal masses. As a result, they may not react quickly enough to increases in temperatures to prevent damage to portable desiccant dehumidifier 100. Pressure switch 910, however, is quick enough to react to such situations and therefore protect portable desiccant dehumidifier 100 from heat damage due to low reactivation airflow 102. This may allow the other thermal switches to be set higher than might have been necessary if the thermal switches were solely relied upon to detect low or no reactivation airflow 102 situations.

In some embodiments, tube 920A, which connects pressure switch 910 to first location 921, exits cabinet 105 and runs along an exterior portion of cabinet 105 before re-entering cabinet 105 proximate to first location 921. Such a configuration may permit desiccant cassette 174 to be easily removed through a removable panel on front side 106C of cabinet 105 without having to move, adjust, or reconfigure tube 920A. In some embodiments, the portion of tube 920A that runs on the exterior of cabinet 105 may be routed between cabinet 105 and skid plate 160. For example, skid plate 160 may include one or more raised grooves as illustrated in FIG. 3, and tube 920A may run at least partially within a portion of one of the raised grooves. This protects tube 920A from damage and also prevents operators from having to connect and disconnect tube 920A (e.g., during maintenance operations or when removing desiccant cassette 174). As a result, safety concerns and tripping nuisances may be reduced or eliminated.

FIGS. 10-11 illustrate an example embodiment of control panel 140 of portable desiccant dehumidifier 100. In the illustrated embodiment, control panel 140 includes a power setting switch 141, a control mode switch 142, an external control connector 143, a high heater lamp 144, a low heater lamp 146, a reactivation airflow lamp 147, a run time meter 148, and a process fan speed control knob 149. While a particular arrangement of control mode switch 142, external control connector 143, high heater lamp 144, low heater lamp 146, reactivation airflow lamp 147, run time meter 148, and process fan speed control knob 149 are illustrated in FIGS. 10-11, other embodiments may have other configurations of these components. In addition, other embodiments may have more or fewer components than those illustrated in FIGS. 10-11.

Power setting switch 141 enables an operator to select between two different power levels for portable desiccant dehumidifier 100: "high" or "low." If power setting switch 141 is set to "high," both heating banks 1220 as described below in FIG. 12 are activated. This provides the maximum heating (and therefore maximum dehumidification) by portable desiccant dehumidifier 100. In some embodiments, the "high" setting for portable desiccant dehumidifier 100 requires portable desiccant dehumidifier 100 to be plugged into a 50 A power source (e.g., a residential electrical outlet for a stove/range). If power setting switch 141 is set to "low," only one heating bank 1220 is activated (e.g., either heating bank 1220A or heating bank 1220B). This provides a reduced heating capacity (and therefore less dehumidification) by portable desiccant dehumidifier 100 than the high setting. In some embodiments, the "low" setting for portable desiccant dehumidifier 100 permits portable desiccant dehumidifier 100 to be plugged into a 30 A power source (e.g., a residential electrical outlet for an electric dryer).

In some embodiments, portable desiccant dehumidifier 100 may run on either 50 A or 30 A electrical service, depending on the setting of power setting switch 141 and the type of electrical outlet used to power portable desiccant dehumidifier 100. For example, an operator may only have access to a 30 A electric dryer outlet in a residence in which portable desiccant dehumidifier 100 is to be used. In this scenario, the operator may simply connect a power cable from the 30 A electric dryer outlet to portable desiccant dehumidifier 100 (e.g., to input plug 1240) and set power setting switch 141 to "low" in order to operate portable desiccant dehumidifier 100 on its low setting. On the other hand, if a 50 A electric range outlet is available in a residence in which portable desiccant dehumidifier 100 is to be used, the operator may simply connect a power cable from the 50 A electric dryer outlet to portable desiccant dehumidifier 100 (e.g., to input plug 1240) and set power setting switch 141 to "high" in order to operate portable desiccant dehumidifier 100 on its high setting. In some embodiments, portable desiccant dehumidifier 100 may include a single power input plug 1240 (as illustrated in FIG. 12) that may accept either 30A or 50A input power. This may permit the operator of portable desiccant dehumidifier 100 to easily power portable desiccant dehumidifier 100 using either 30A or 50A service in a residence without having to manually reconfigure circuitry or wires within portable desiccant dehumidifier 100. More details about the electronic circuitry of portable desiccant dehumidifier 100 that permits either 30A or 50A input power is described below in reference to FIG. 13.

Control mode switch 142 allows an operator to turn portable desiccant dehumidifier 100 on ("ALWAYS ON") or off ("OFF") or to select to control portable desiccant dehumidifier 100 via inputs to external control connector 143 ("EXTERNAL CONTROL"). When "EXTERNAL CONTROL" is selected, any 24 VAC control circuit (e.g., humidistat or other control) that is connected to external control connector 143 may control portable desiccant dehumidifier 100. In some embodiments, when the 24 VAC external contacts are closed (external switch is closed), portable desiccant dehumidifier 100 dehumidifies normally. In some embodiments, when the 24 VAC external contacts are open, process airflow fan 117 and reactivation airflow fan 127 continue to operate, but one or more heating banks 1220 are de-energized. In some embodiments, both process airflow fan 117 and reactivation airflow fan 127 may be turned off when the 24 VAC external contacts are open.

In some embodiments, portable desiccant dehumidifier 100 includes three indicator status lights for easy troubleshooting: high heater lamp 144, low heater lamp 146, and reactivation airflow lamp 147. High heater lamp 144 illuminates when heating bank 1220B of heater 145 is energized. Low heater lamp 146 illuminates when heating bank 1220A of heater 145 is energized. Reactivation airflow lamp 147 illuminates when there is sufficient reactivation airflow 102. In some embodiments, reactivation airflow lamp 147 may be controlled by pressure switch 910.

Run time meter 148 is any appropriate display that indicates the elapsed run time of portable desiccant dehumidifier 100. Any appropriate dial, meter, display, etc. may be used for run time meter 148.

Process fan speed control knob 149 allows an operator to choose the volume of process airflow 101 that flows through portable desiccant dehumidifier 100. At its lowest setting of "MAX GRAIN DEPRESSION," process airflow 101 will be at its lowest amount. On this setting, process airflow fan 117 operates at its lowest possible speed (or a preconfigured low speed), which provides the driest process airflow 101 exiting out of process airflow outlet 115. This setting may be useful for specialized applications where the first pass must be as dry as possible (e.g., hardwood flooring, concrete, etc.) At its highest setting of "MAX WATER REMOVAL," process airflow 101 will be at its highest amount. On this setting, process airflow fan 117 operates at its highest possible speed (or a preconfigured high speed), which provides the maximum water removal rate (e.g., pints per day, etc.). In some embodiments, process fan speed control knob 149 may be a variable knob that may be set to any setting between "MAX GRAIN DEPRESSION" and "MAX WATER REMOVAL." To achieve this, some embodiments include a variable frequency drive ("VFD") 1310 as illustrated in FIGS. 7 and 13. In some embodiments, single phase 208-240 VAC is provided to VFD 1310, which generates 3-phase power to process airflow fan 117. Adjustments to process fan speed control knob 149, which may be electrically or communicatively coupled to VFD 1310, cause corresponding speed adjustments to process airflow fan 117 via outputs from VFD 1310.

FIG. 12 illustrates an embodiment of heater 145 of portable desiccant dehumidifier 100. In some embodiments, heater 145 includes heating elements 1210 (e.g., heating elements 1210A-F), heating banks 1220 (e.g., heating banks 1220A-B), and radiant heat shields 1230. Radiant heat shields 1230 are any appropriate material such as a metal to shield interior components of portable desiccant dehumidifier 100 from unwanted heat from heater 145. Any appropriate number and configuration of radiant heat shields 1230 may be used.

In particular embodiments, heater 145 includes six heating elements 1210 that are divided into two heating banks 1220: first heating bank 1220A includes heating elements 1210A-C, and second heating bank 1220B includes heating elements 1210D-E. Heating banks 1220 may be separately enabled or disabled by, for example, electrical circuit 1300 described in FIG. 13 below. More particularly, heating elements 1210 of heating bank 1220A (i.e., heating elements 1210A-C) may be separately enabled/disabled from heating elements 1210 of heating bank 1220B (i.e., heating elements 1210D-F). This may permit portable desiccant dehumidifier 100 to operate in a low or high mode, such as that described above in reference to power setting switch 141.

In some embodiments, the wattage of heating elements 1210 are varied based on local airflow to create even temperatures and minimize glowing coils, which shortens their life. For example, a particular embodiment of portable desiccant dehumidifier 100 has the following wattages for heating element 1210: 1710 W for heating element 1210A, 1350 W for heating element 1210B, 900 W for heating element 1210C, 1080 W for heating element 1210D, 1350 W for heating element 1210E, and 2250 W for heating element 1210F. In this particular embodiment, higher wattage heating elements 1210 are used where airflow is higher (and vice versa). More specifically, the flow of reactivation airflow 102 out of reactivation airflow fan 127 is greater close to the sides of heater 145 (i.e., towards right side 106E and left side 106F) in some embodiments, thus the wattages of heating elements 1210 increase from heating element 1210C towards heating element 1210A, and from heating element 1210C towards heating element 1210F (i.e., from the center of heater 145 outwards). This particular configuration may provide certain benefits such as preventing damage to desiccant 170 due to excessive temperatures while ensuring that all areas of desiccant 170 reach a sufficient temperature to drive off moisture. While specific wattages and configurations of heating elements 1210 have been described, other wattages and configurations may be utilized by other embodiments.

In some embodiments, portable desiccant dehumidifier 100 provides process airflow 101 with a uniform (or near uniform) temperature as it exits process airflow outlet 115. In other words, process airflow 101 may have a uniform temperature from the top of process airflow outlet 115 to the bottom of 115, and from the left of process airflow outlet 115 to the right of process airflow outlet 115 as it exits portable desiccant dehumidifier 100. This may allow portable desiccant dehumidifier 100 to be used to dry sensitive areas affected by water (e.g., wood floors) without causing damage. As used herein, a uniform temperature of process airflow 101 at process airflow outlet 115 means that a temperature measured at any location within process airflow 101 as it exits process airflow outlet 115 is the same as (or is within a certain minimal percentage of) all other locations (or a majority of all other locations) within process airflow 101. For example, temperatures measured within process airflow 101 that are within 1-5% of each other may be considered to be uniform temperatures. Such uniform temperatures of process airflow 101 may be possible due to the rotation direction of desiccant 170. For example, when desiccant 170 has a counter-clockwise rotation direction when viewed from above portable desiccant dehumidifier 100 (i.e., when looking from top side 106A towards bottom side 106B), the hottest portion of desiccant 170 (i.e., the area of desiccant 170 right after it exits reactivation airflow 102) enters the process airflow 101 at a point that is farthest from process airflow outlet 115. This allows for dilution of warm/hot air within process airflow 101 by cooler air within process airflow 101 before exiting through process airflow outlet 115, thereby providing process airflow 101 with a uniform (or near uniform) temperature as it exits process airflow outlet 115.

In some embodiments, portable desiccant dehumidifier 100 may provide process airflow 101 with a non-uniform temperature as it exits process airflow outlet 115 by rotating desiccant 170 in a clockwise direction when viewed from above portable desiccant dehumidifier 100 (i.e., when looking from top side 106A towards bottom side 106B). This rotation direction causes the hottest portion of desiccant 170 (i.e., the area of desiccant 170 right after it exits reactivation airflow 102) to enter process airflow 101 at a point that is closest to process airflow outlet 115. This prevents or reduces the ability for any dilution of warm/hot air within process airflow 101 by cooler air within process airflow 101 before exiting through process airflow outlet 115, thereby contributing to non-uniform temperature of process airflow 101. A clockwise direction of desiccant 170 may maximize dehumidification on the low power setting (only one heating bank 1220 energized) because the heating bank 1220 that is energized (i.e., heating bank 1220A) would deliver the heat to desiccant 170 immediately before it enters process airflow 101. As a result, desiccant 170 would be the driest when entering process airflow 101 and would be able to adsorb more moisture. If the other heating bank 1220 was energized in this configuration (i.e., heating bank 1220B), desiccant 170 could potentially adsorb moisture from reactivation airflow 102 before entering process airflow 101, which would reduce the ability of desiccant 170 to adsorb moisture.

FIG. 13 illustrates an electrical circuit 1300 that may be utilized by certain embodiments of portable desiccant dehumidifier 100. In general, electrical circuit 1300 provides power and safety features to the components of portable desiccant dehumidifier 100. Electrical circuit 1300 may include a high-voltage portion 1301 and a low-voltage portion 1302. High-voltage portion 1301, which may operate on 208-240 VAC, includes process airflow fan 117, reactivation airflow fan 127, heating banks 1220A-B, desiccant motor 173, VFD 1310, and various other contactors, relays, fuses, etc. as illustrated. Low-voltage portion 1302, which may operate on 24 VAC, includes power setting switch 141, control mode switch 142, external control connector 143, high heater lamp 144, low heater lamp 146, reactivation airflow lamp 147, run time meter 148, pressure switch 910, a heater thermal switch 1320, a process airflow thermal switch 1330, a VFD relay contact 1340, a reactivation airflow thermal switch 1350, delay timers 1360, and various other contactors, relays, fuses, etc. as illustrated.

Heater thermal switch 1320 is any appropriate thermal switch that detects when excessive heat is present. In some embodiments, heater thermal switch 1320 is located in heater 145 between heating banks 1220A and 1220B and detects excessive temperatures in reactivation airflow 102 or low volume of reactivation airflow 102. In some embodiments, heater thermal switch 1320 is normally closed and opens when excessive heat is detected. In some embodiments, heater thermal switch 1320 only disconnects heating bank 1220B when it is open, as illustrated in FIG. 13.

Process airflow thermal switch 1330, like heater thermal switch 1320, is any appropriate thermal switch that detects when excessive heat is present. In general, process airflow thermal switch 1330 is located in any appropriate location within process airflow 101 inside cabinet 105 prior to desiccant 170. In some embodiments, process airflow thermal switch 1330 is mounted to a bracket that holds process airflow fan 117. Process airflow thermal switch 1330 detects excessive temperatures in process airflow 101 (e.g., from repeatedly recirculating a small volume of air through portable desiccant dehumidifier 100). In some embodiments, process airflow thermal switch 1330 is normally closed, and opens when excessive heat is detected. In some embodiments, heater thermal switch 1320 disconnects both heating banks 1220A and 1220B when it is open, as illustrated in FIG. 13.

VFD relay contact 1340 is a normally open switch that closes when VFD 1310 is operating error-free. When VFD relay contact 1340 closes due to an error within VFD 1310, both heating banks 1220A and 1220B are disabled, as illustrated in FIG. 13. This prevents both heating banks 1220A and 1220B from energizing when process airflow fan 117 is not operating. In some embodiments, VFD relay contact 1340 may be integrated within VFD 1310, but may be separate in other embodiments.

Reactivation airflow thermal switch 1350 is similar to process airflow thermal switch 1330 in that it detects excessive temperatures in reactivation airflow 102 (e.g., from external sources). Reactivation airflow thermal switch 1350 is located in any appropriate location within reactivation airflow 102 inside cabinet 105 prior to heater 145. In some embodiments, reactivation airflow thermal switch 1350 is normally closed, and opens when excessive heat is detected. In some embodiments, reactivation airflow thermal switch 1350 disconnects both heating banks 1220A and 1220B when it is open, as illustrated in FIG. 13.

Delay timers 1360 are any appropriate timers that are normally open when not energized but then close a certain amount of time after being energized. In some embodiments, delay timers 1360 are two-second delay timers, but may be delay timers of any other appropriate amount of time.

The unique arrangement of heater thermal switch 1320 within electrical circuit 1300 permits portable desiccant dehumidifier 100 to operate in a reduced capacity "limp" mode even if excessive heat is detected by heater thermal switch 1320. More specifically, if heater thermal switch 1320 is tripped for any reason, only heating bank 1220B will be disabled, as illustrated in FIG. 13. Heating bank 1220A will continue to operate in this scenario, allowing portable desiccant dehumidifier 100 to continue to operate with partial heating (and therefore partial dehumidification).

FIG. 14 illustrates a desiccant wheel 1400 of the portable desiccant dehumidifier of FIGS. 1-5, according to certain embodiments. In some embodiments, desiccant wheel 1400 may be used as desiccant 170. Desiccant wheel 1400 is generally wheel-shaped with two flat opposing surfaces (i.e., a top surface and a bottom surface that is opposite the top surface) and a curved side surface. As illustrated in FIG. 7, process airflow 101 may enter the top surface of desiccant wheel 1400 and exit the bottom surface of desiccant wheel 1400. Conversely, reactivation airflow 102 may enter the bottom surface of desiccant wheel 1400 and exit the top surface of desiccant wheel 1400. In some embodiments, desiccant wheel 1400 may have any appropriate dimensions and be may be made of any appropriate material as described above in reference to desiccant 170.

Desiccant wheel 1400 may be removed and inserted into desiccant cassette 174 as needed (e.g., to be replaced). Desiccant cassette 174, as described above, may be removed and inserted into desiccant compartment 172. In some embodiments, desiccant cassette 174 includes portions 1474 and a bottom portion 1480. Portions 1474 include a front portion 1474C (which corresponds to front side 106C of portable desiccant dehumidifier 100), a back portion 1474D (which corresponds to back side 106D of portable desiccant dehumidifier 100), a left portion 1474F (which corresponds to left side 106F of portable desiccant dehumidifier 100), and a right portion 1474E (which corresponds to right side 106E of portable desiccant dehumidifier 100). In some embodiments, right portion 1474E includes a cutout as illustrated for reactivation airflow outlet 125.

In some embodiments, desiccant cassette 174 may include a cross member 1440 as illustrated. Cross member 1440 may attach to left portion 1474F and right portion 1474E of desiccant cassette 174 with any appropriate fastener or coupling mechanism (e.g., screws, rivets, welding, adhesives, etc.). Cross member 1440 may be made of any appropriate material such as metal or plastic. Cross member 1440 may provide structural support for desiccant cassette 174 and may provide an attachment point for cross member 1440. For example, desiccant wheel 1400 may attach to cross member 1440 at a center point 1410. desiccant wheel 1400 may attach to cross member 1440 with any appropriate mechanism to allow desiccant wheel 1400 to rotate within desiccant cassette 174. In some embodiments, desiccant wheel 1400 may include a small protrusion (e.g., a rod, peg, bolt, etc.) that may be inserted into an aperture of cross member 1440 (e.g., a hole in cross member 1440 at center point 1410). In other embodiments, any appropriate bearing or fastener may be used to attach desiccant wheel 1400 to cross member 1440 at center point 1410 so that desiccant wheel 1400 may rotate within desiccant cassette 174.

In some embodiments, desiccant wheel 1400 includes a band 1420 around its outer circumference. In general, band 1420 permits the rotation of desiccant wheel 1400 when portable desiccant dehumidifier 100 is in either its vertical or horizontal positions. Band 1420 is generally circular in shape and may be made of any appropriate material such as metal, plastic, cardboard, and the like. Band 1420 encases desiccant wheel 1400 to provide support to desiccant wheel 1400 and to provide a mechanism by which desiccant wheel 1400 may be rotated.

In some embodiments, band 1420 includes sprocket holes 1430 around its circumference. Sprocket holes 1430 may be any appropriate shape such as circular, rectangular, or square. In some embodiments, sprocket holes 1430 are arranged in a line around the circumference of sprocket holes 1430 as illustrated. In general, sprocket holes 1430 permit a sprocket such as sprocket 1710 described below to engage with band 1420. As a result, desiccant wheel 1400 may rotate when a motor or other mechanism rotates the sprocket.

Band 1420 may or may not be the full height of desiccant wheel 1400. For example, desiccant wheel 1400 may have a first height (e.g., from its top surface to its bottom surface), and band 1420 may have a second height that is greater than or equal to the first height of desiccant wheel 1400 (i.e., band 1420 may be the same height or taller than desiccant wheel 1400). In other embodiments, band 1420 may be shorter than the height of desiccant wheel 1400. For example, band 1420 may be just tall enough to support sprocket holes 1430 in order to conserve cost and weight of portable desiccant dehumidifier 100.

FIGS. 15-16 illustrate a side seal 1600 of desiccant wheel 1400, according to certain embodiments. In general, two side seals 1600 (e.g., 1600A-B) may be utilized by portable desiccant dehumidifier 100 to keep process airflow 101 separated from reactivation airflow 102. For example, a left side seal 1600A may be included adjacent to left portion 1474F of desiccant cassette 174, and a right side seal 1600B may be included adjacent to right portion 1474E of desiccant cassette 174. In general, side seals 1600 form a barrier between desiccant cassette 174 and desiccant wheel 1400 so that process airflow 101 and reactivation airflow 102 do not mix. This may allow for a lower pressure drop through the side of desiccant wheel 1400 through which reactivation airflow 102 flows. In some embodiments, side seals 1600 are positioned front-to-back within desiccant cassette 174 (i.e., from front portion 1474C to back portion 1474D) so that desiccant wheel 1400 is split evenly between process airflow 101 and reactivation airflow 102 (i.e., half of desiccant wheel 1400 is for process airflow 101 and the other half is for reactivation airflow 102). Side seals 1600 generally extend from cross member 1440 to bottom portion 1480 of desiccant cassette 174. Side seals 1600 may be made of any appropriate material in order to form a seal between desiccant wheel 1400 and desiccant cassette 174. For example, side seals 1600 may be made of rubber.

In general, side seals 1600 may be utilized by some embodiments of portable desiccant dehumidifier 100 because desiccant wheel 1400 includes sprocket holes 1430 instead of teeth. If desiccant wheel 1400 were to include teeth or other protrusions, side seals 1600 would be damaged by the protrusions as desiccant wheel 1400 rotates. However, because band 1420 may include sprocket holes 1430, side seals 1600 may be utilized by portable desiccant dehumidifier 100 to keep process airflow 101 separated from reactivation airflow 102.

In some embodiments, cross member 1440 also helps keep process airflow 101 separated from reactivation airflow 102. As illustrated in FIGS. 14 and 16, cross member 1440 may run along the top surface of desiccant wheel 1400. In some embodiments, cross member 1440 is made of metal and contacts desiccant wheel 1400 directly in order to form a seal along the top surface of desiccant wheel 1400. In other embodiments, cross member 1440 may include a material (e.g., rubber) along the edge between cross member 1440 and desiccant wheel 1400 in order to form the seal.

In some embodiments, one or more spacers 1610 may be included to help ensure correct seal compression after fasteners (e.g., screws) of desiccant cassette 174 are tightened. For example, spacers 1610 may be included in locations illustrated in FIG. 15. This may allow for the correct alignment of cross member 1440 with left portion 1474F and right portion 1474E of desiccant cassette 174 as it is fastened using screws. This, in turn, may cause side seals 1600 to be correctly positioned to form a seal around desiccant wheel 1400.

FIG. 17 illustrates a drive mechanism 1700 of desiccant wheel 1400, according to certain embodiments. Drive mechanism 1700 generally includes desiccant motor 173 and a sprocket 1710. Sprocket 1710 may be of any shape and may have any number of teeth. The teeth of sprocket 1710 engage with sprocket holes 1430 of band 1420 in order to rotate desiccant wheel 1400. Sprocket 1710 may be installed with its teeth up (i.e., towards desiccant motor 173), or it may be installed with is teeth down (i.e., away from desiccant motor 173 as illustrated in FIG. 17.) In some embodiments, sprocket 1710 may be directly coupled to desiccant motor 173. For example, sprocket 1710 may be coupled to a drive shaft of desiccant motor 173. In other embodiments, sprocket 1710 may be turned by desiccant motor 173 via a chain, rope, or any other mechanism.

In some embodiments, desiccant motor 173 may be mounted to a plate 1720. Plate 1720 may be configured to rotate or pivot within desiccant cassette 174 to a certain degree to permit desiccant motor 173 to remained properly aligned with desiccant wheel 1400. For example, desiccant wheel 1400 or band 1420 may have slight imperfections due to manufacturing defects that would typically cause sprocket 1710 to become disengaged with sprocket holes 1430 as desiccant wheel 1400 rotates. By permitting plate 1720 to rotate or pivot within desiccant cassette 174, the rotation axis of sprocket 1710 may remain parallel to the axis of rotation of desiccant wheel 1400 and thus sprocket 1710 may remain engaged with sprocket holes 1430.

In some embodiments, a tension spring (not illustrated) may be included to help keep sprocket 1710 engaged with sprocket holes 1430. For example, a tension spring may couple desiccant motor 173, sprocket 1710, or plate 1720 with a portion of desiccant cassette 174 to help keep sprocket 1710 engaged with sprocket holes 1430. In some embodiments, the tension spring may couple to notches 1730 in cross member 1440 and plate 1720.

Although a particular implementation of portable desiccant dehumidifier 100 is illustrated and primarily described, the present disclosure contemplates any suitable implementation of portable desiccant dehumidifier 100, according to particular needs. Moreover, although various components of portable desiccant dehumidifier 100 have been depicted as being located at particular positions, the present disclosure contemplates those components being positioned at any suitable location, according to particular needs.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A portable dehumidifier, comprising:
   a cabinet;
   a plurality of wheels coupled to the cabinet;
   a desiccant cassette configured to be inserted into the cabinet;
   a desiccant wheel configured to be removably coupled to the desiccant cassette, the desiccant wheel comprising:
      a band around an outer circumference of the desiccant wheel; and
      a plurality of sprocket holes formed in the band, the plurality of sprocket holes being arranged in a line;
   a sprocket comprising a plurality of teeth that are configured to be inserted into the plurality of sprocket holes of the hand; and
   a motor configured to rotate the sprocket, thereby causing the desiccant wheel to rotate within the desiccant cassette.

2. The portable dehumidifier of claim 1, further comprising
   a first fan configured to generate a process airflow that flows through a first portion of the desiccant wheel in order to provide dehumidification;
   a second fan configured to generate a reactivation airflow that flows through a second portion of the desiccant wheel in order to dry the desiccant wheel; and
   a variable frequency drive (VFD) coupled to the first fan and operable to control a speed of the first fan.

3. The portable dehumidifier of claim 2, wherein the desiccant cassette comprises:
   a plurality of seals each configured to the keep the process airflow separate from the reactivation airflow.

4. The portable dehumidifier of claim 1, wherein the motor is coupled to a plate, the plate configured to rotate in order to keep the teeth of the sprocket engaged with the sprocket holes.

5. The portable dehumidifier of claim 1, wherein:
   the desiccant wheel comprises a first height;
   the band is made of metal; and
   the band comprises a second height that is greater than or equal to the first height of the desiccant wheel.

6. The portable dehumidifier of claim 1, wherein:
the motor comprises a drive shaft; and
the drive shaft is directly coupled to the sprocket.

7. A portable dehumidifier, comprising:
a desiccant cassette;
a desiccant wheel configured to the removably coupled to the desiccant cassette, the desiccant wheel comprising:
a band around an on circumference of the desiccant wheel; and
a plurality of sprocket holes formed in the band;
a sprocket comprising a plurality of teeth that are configured to be inserted into the plurality of sprocket holes of the band; and
a motor configured to rotate the sprocket, thereby causing the desiccant wheel to rotate within the desiccant cassette.

8. The portable dehumidifier of claim 7, further comprising
a first fan configured to generate a process airflow that flows through a first portion of the desiccant wheel in order to provide dehumidification; and
a second fan configured to generate a reactivation airflow that flows through a second portion of the desiccant wheel in order to dry the desiccant wheel.

9. The portable dehumidifier of claim 8, wherein the desiccant cassette comprises:
a plurality of seals each configured to the keep the process airflow separate from the reactivation airflow.

10. The portable dehumidifier of claim 7, wherein the motor is coupled to a plate, the plate configured to rotate in order to keep the teeth of the sprocket engaged with the sprocket holes.

11. The portable dehumidifier of claim 7, wherein the plurality of sprocket holes are:
arranged in a line.

12. The portable dehumidifier of claim 7, wherein:
the desiccant wheel comprises a first height;
the band is made of metal; and
the band comprises a second height that is greater than or equal to the first height of the desiccant wheel.

13. The portable dehumidifier of claim 7, wherein;
the motor comprises a drive shaft; and
the drive shaft is directly coupled to the sprocket.

14. A desiccant wheel for a dehumidifier, the desiccant wheel comprising:
a band around an outer circumference of the desiccant wheel; and
a plurality of sprocket holes formed in the band, wherein:
the plurality of sprocket holes are configured for coupling the desiccant wheel to a sprocket via a plurality of teeth of the sprocket;
the desiccant wheel is configured to rotate when the sprocket is rotated by a motor.

15. The desiccant wheel f claim 14, wherein:
the desiccant wheel is configured to be removably coupled to a desiccant cassette;
the desiccant cassette is configured to be inserted into the dehumidifier, the dehumidifier comprising:
a first fan configured to generate a process airflow that flows through a first portion of the desiccant wheel in order to provide dehumidification; and
a second fan configured to generate a reactivation airflow that flows through second portion of the desiccant wheel in order to dry the desiccant wheel.

16. The desiccant wheel of claim 15, wherein the desiccant cassette comprises:
a plurality of seals each configured to the keep the process airflow separate from the reactivation airflow.

17. The desiccant wheel of claim 14, wherein the plurality of sprocket holes are:
arranged in a line.

18. The desiccant wheel of claim 14, wherein:
the desiccant wheel comprises a first height;
the band is made of metal or plastic; and
the band comprises a second height that is greater than or equal to the first height of the desiccant wheel.

19. The desiccant wheel of claim 14, wherein:
the sprocket is directly coupled to a drive shaft of a motor.

* * * * *